(12) United States Patent
Denison

(10) Patent No.: US 8,352,030 B2
(45) Date of Patent: *Jan. 8, 2013

(54) CAPACITIVE INTERFACE CIRCUIT FOR LOW POWER SENSOR SYSTEM

(75) Inventor: Timothy J. Denison, Minneapolis, MN (US)

(73) Assignee: Medtronic, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/182,276

(22) Filed: Jul. 13, 2011

(65) Prior Publication Data

US 2011/0267212 A1    Nov. 3, 2011

Related U.S. Application Data

(63) Continuation of application No. 11/789,453, filed on Apr. 24, 2007, now Pat. No. 8,000,789.

(60) Provisional application No. 60/847,748, filed on Sep. 28, 2006.

(51) Int. Cl.
*A61N 1/362* (2006.01)

(52) U.S. Cl. .......................................................... 607/17

(58) Field of Classification Search ................... 324/76, 324/38; 327/95

See application file for complete search history.

(56) References Cited

U.S. PATENT DOCUMENTS

| | | | |
|---|---|---|---|
| 3,631,424 A | 12/1971 | Regitz | |
| 4,385,321 A | 5/1983 | Malm | |
| 5,445,006 A | 8/1995 | Allen et al. | |
| 5,587,518 A | 12/1996 | Stevenson et al. | |
| 5,748,004 A | 5/1998 | Kelly et al. | |
| 5,838,176 A | 11/1998 | Delbruck et al. | |
| 5,939,633 A | 8/1999 | Judy | |
| 6,387,048 B1 | 5/2002 | Schulman et al. | |
| 6,448,599 B1 | 9/2002 | Wang | |
| 6,629,448 B1 | 10/2003 | Cvancara | |
| 6,658,292 B2 | 12/2003 | Kroll et al. | |
| 6,673,596 B1 | 1/2004 | Sayler et al. | |
| 2003/0045910 A1 | 3/2003 | Sorensen et al. | |
| 2004/0002742 A1 | 1/2004 | Florio | |
| 2004/0210214 A1 | 10/2004 | Knowlton | |
| 2005/0010265 A1 | 1/2005 | Baru Fassio et al. | |

(Continued)

FOREIGN PATENT DOCUMENTS

EP     1548409     6/2005

(Continued)

OTHER PUBLICATIONS

Official Action dated Sep. 14, 2011 for Japanese Application No. 2009-530331 (4 pgs.).

(Continued)

*Primary Examiner* — Carl H Layno
*Assistant Examiner* — Paula J Stice
(74) *Attorney, Agent, or Firm* — Shumaker & Sieffert, PA

(57) ABSTRACT

A capacitive interface circuit for a low power system is described. The capacitive interface circuit is configured to achieve very low noise sensing of capacitance-based transducers, such as a micro-electro-mechanical system (MEMS)-based sensor, with high resolution and low power. The capacitive interface circuit uses a differential amplifier and correlated triple sampling (CTS) to substantially eliminate, or at least reduce, kT/C noise, as well as amplifier offset and flicker (1/f) noise, from the output of the amplifier. The capacitive interface circuit may further include an output stage that reduces glitching, i.e., clock transients, in the output signal by allowing transients in the amplifier output to settle. In this manner, the circuit can be used in a low power system to produce a stable, low-noise output.

43 Claims, 9 Drawing Sheets

U.S. PATENT DOCUMENTS

| | | | |
|---|---|---|---|
| 2005/0168800 | A1 | 8/2005 | Hiraoka et al. |
| 2006/0107148 | A1 | 5/2006 | Ginggen et al. |
| 2006/0152842 | A1 | 7/2006 | Pasolini et al. |
| 2008/0100280 | A1 | 5/2008 | Masson et al. |

FOREIGN PATENT DOCUMENTS

| | | |
|---|---|---|
| JP | H04126477 | 11/1992 |
| JP | 11136558 A | 5/1999 |
| WO | 2005103739 | 11/2005 |

OTHER PUBLICATIONS

Notification of Transmittal of the International Search Report and the Written Opinion of the International Searching Authority, dated Sep. 22, 2008 for corresponding PCT Application No. PCT/US2007/009851, (11 pgs.).

Reply to Written Opinion dated Dec. 18, 2008 for corresponding PCT Application No. PCT/US2007/009851, (22 pgs.).

Notification of Transmittal of the International Preliminary Report on Patentability, dated Feb. 3, 2009 for corresponding PCT Application No. PCT/US2007/009851, (17 pgs.).

Sadat et al., "Low-Power CMOS Wirelss MEMS Motion Sensor for Physiological Activity Monitoring," IEEE Transactions on Circuits and Systems I: Regular Papers, vol. 52, No. 12, pp. 2539-2551 Dec. 2005.

Kämäräinen et al., "A Micropower Differential Charge-Balancing Switched-Capacitor Front-End for Capacitive Microaccelerometers," Circuit Theory and Design, 2005. Proceedings of the 2005 European Conference, vol. 3, Issue 28, pp. III/421-III/424 (2005).

Yazdi et al., "An Interface IC for a Capacitive Silicon µg Accelerometer," IEEE International Solid-State Circuits Conference, pp. 132-133 and 454 (1999).

Tavakoli et al., "An Offset-Canceling Low-Noise Lock-In Architecture for Capacitive Sensing," IEEE Journal of Solid-State Circuits, vol. 38, No. 2, pp. 244-253 (2003).

Lemkin et al., "A Three-Axis Micromachined Accelerometer with a CMOS Position-Sense Interface and Digital Offset-Trim Electronics," IEEE Journal of Solid-State Circuits, vol. 34, No. 4, pp. 456-468 (1999).

Amini et al., "A High Resolution, Stictionless, CMOS Compatible SOI Accelerometer with a Low Noise, Low Power, 0.25µm CMOS Interface,"IEEE International Conference, pp. 572-575 (2004).

Fedder et al., "Monolithically Integrated Inertial Sensors," Advanced Micro and Nanosystems, vol. 2, CMOS—MEMS, pp. 137-191 (2005).

Wongkomet et al., "Correlated Double Sampling in Capacitive Position Sensing Circuits for Micromachined Applications," IEEE Asia-Pacific Conference, pp. 723-726 (1998).

STMicroelectronics, "LIS3L02AQ Inertial Sensor: 3Axis—2g/6g Linear Accelerometer", 9 pages, Nov. 2004.

STMicroelectronics, "AN2133 Application Note, LIS3L02DQ 3Axis—+2g Digital Output Linear Accelerometer", 28 pages, 2005.

Harrison et al., "Local Field Potential Measurement with Low-Power Analog Integrated Circuit," Engineering in Medicine and Biology Society, 2004, IEMBS '04, 26th Annual International Conference of the IEEE, vol. 2, On pp. 4067-4070 vol. 6, Sep. 1-5, 2004.

Martins et al., "A CMOS IC for Portable EEG Acquisition Systems," IEEE Transactions on Instrumentation and Measurement, vol. 47, No. 5, pp. 1191-1196, Oct. 1998.

Boser, "Capacitive Interfaces for Monolithic Integrated Sensors," Chapter in "RF Analog-to-Digital Converters; Sensor and Actuator Interfaces; Low-Noise Oscillators, PLLs and Synthesizers," R.J. van de Plaasche, J.H. Huijsing, and W. M.C. Sansen (eds.), Kluwer Academic Publishers, Nov. 1997.

CAPACITIVE INTERFACE CIRCUIT FOR LOW POWER SENSOR SYSTEM

This application is a continuation of U.S. application Ser. No. 11/789,453, titled "CAPACITIVE INTERFACE CIRCUIT FOR LOW POWER SENSOR SYSTEM," filed Apr. 24, 2007 now U.S. Pat. No. 8,000,789, which claims the benefit of U.S. provisional application No. 60/847,748, filed Sep. 28, 2006, the entire contents of each of which is incorporated by reference.

TECHNICAL FIELD

The invention relates to sensor interface circuits and, more particularly, capacitive interface circuitry for low power sensor systems.

BACKGROUND

In micromachined systems, such as micro-electromechanical systems (MEMS) sensors, variable capacitors serve as the interface between a sensor, e.g., an accelerometer, gyroscope, pressure sensor, humidity sensor, or other types of micromachined sensors, and the measurement circuitry. Such sensors have a wide variety of applications including industrial, environmental, and/or physiological monitoring. Physiological monitoring has various biomedical applications including monitoring of posture, activity, gait, intravenous pressure, intracranial pressure, heart sounds, and the like.

In an accelerometer, for example, capacitive plates may be formed by fingers on a beam coupled to a proof mass and fixed fingers coupled to an inertial frame. The sets of fingers are interdigitated and act as capacitor plates that are electrically connected to form variable, differential capacitors. A proof mass is suspended over a substrate by a spring. As the proof mass is deflected in a particular direction, the capacitance measured between a beam finger attached to the proof mass and one of the corresponding fixed fingers coupled to the inertial frame changes, indicating acceleration in a particular direction.

Changes in capacitance due to acceleration along an axis are translated to output voltages by a capacitive interface circuit, which functions as sensing circuitry. For an accelerometer, the capacitive interface circuit processes signals from the variable capacitors to produce sensor signals that represent measurement of motion. The accelerometer may sense motion along one axis, two axes, or three axes.

The variable, differential capacitors in the sensor can be generally approximated as parallel-plate capacitors in which the overlapping area of the plates or the spacing between the plates is a function of the displacement of the beam fingers. The output voltage of a typical switched-capacitor capacitance sensing circuit can be calculated using the following equation:

$$v_o = \frac{\Delta C}{C_I} V_S$$

where $v_o$ is the output voltage of the capacitance sensing circuit, $C_I$ is a feedback capacitance associated with the sensing circuit, $\Delta C$ is the change in capacitance of the variable capacitors, and $V_S$ is the supply voltage.

Because of the size restrictions on the sense element in micromachined systems, the capacitance of the variable capacitors and the change in capacitance is very small, e.g., approximately hundreds of femtofarads to 1-100 attofarads. When the feedback capacitance is approximately the same size as the sense capacitance, the output voltage range is approximately 10 µV to 1 mV and includes sampling noise (kT/C noise). In general, kT/C noise refers to thermal noise in the presence of a filtering capacitor. The kT/C noise is caused by the reset switch of the switched capacitor circuit and is sampled onto the sensing node of the circuit. Consequently, the sensor signal at the output of an amplifier may include amplifier offset, flicker noise (1/f) noise, and kT/C noise that undermine sensor accuracy and performance.

SUMMARY

This disclosure describes a capacitive interface circuit for a low power system. The capacitive interface circuit is configured to achieve very low noise sensing of capacitance-based transducers, such as a micro-electro-mechanical system (MEMS)-based sensor, with high resolution and low power consumption. The capacitive interface circuit uses a differential amplifier and correlated triple sampling (CTS) to substantially reduce kT/C noise and flicker (1/f) noise, and suppress amplifier offset and drift. Rejection of kT/C noise may permit slower interface clocks, and result in power reduction. The capacitive interface circuit may further include an output stage that reduces glitching in the output signal by allowing transients in the amplifier output to settle.

In one embodiment, the invention provides a method comprising amplifying a differential sensor signal to produce an output signal, storing the output signal on a sampling capacitor, and applying a correlated triple sampling process to reduces one or more noise components in the output signal.

In another embodiment, the invention provides a sensor device comprising a sensor, a differential amplifier that amplifies a sensor signal received from the sensor to produce an output signal, a sampling capacitor that stores the output signal, and a correlated triple sampling circuit that reduces one or more noise components in the output signal.

In an additional embodiment, the invention provides a capacitive interface circuit comprising a differential amplifier that amplifies a sensor signal to produce an output signal, a sampling capacitor that stores the output signal, and a correlated triple sampling circuit that reduces one or more noise components in the output signal.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
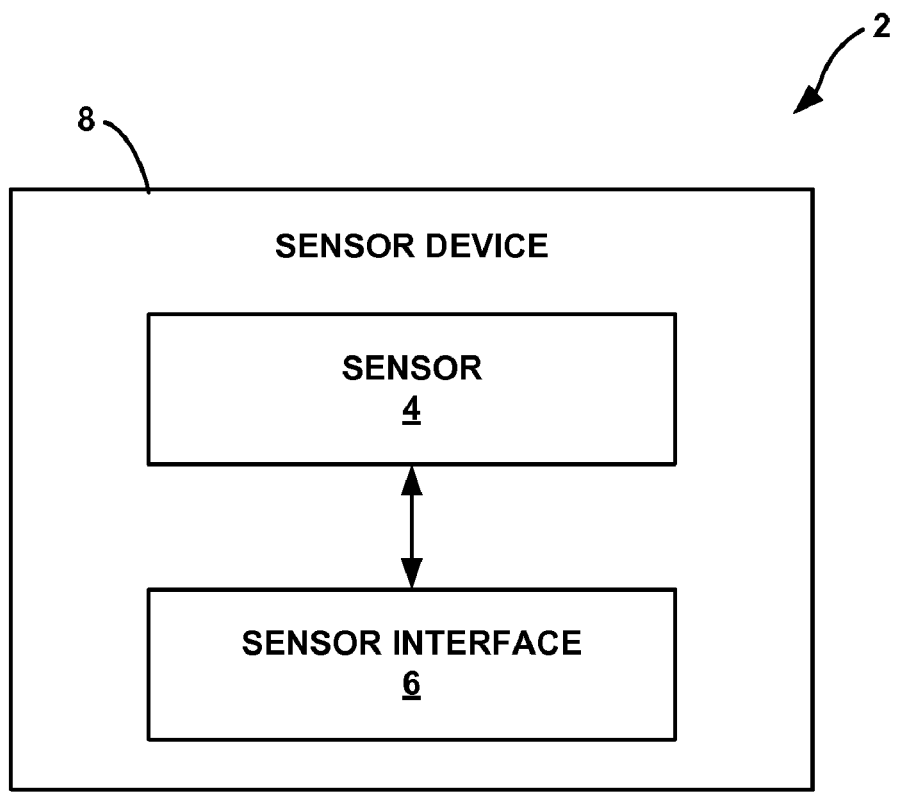
FIG. 1 is a block diagram illustrating a sensor device.

This disclosure describes a capacitive interface circuit for a low power sensor system. The capacitive interface circuit is configured to achieve very low noise sensing via capacitance-based sensors, such as micro-electro-mechanical system (MEMS)-based sensors, with high resolution and low power. The capacitive interface circuit uses a differential amplifier and correlated triple sampling (CTS) to reduce kT/C noise and flicker (1/f) noise, and suppress amplifier offset and drift. The capacitive interface circuit may further include an output stage that reduces glitching in the output signal by allowing transients in the amplifier output to settle. In this manner, the circuit can be used in a low power system to produce a stable, low-noise output.

The capacitive interface circuit may be configured to process signals from a sensing element in a MEMS-based sensor, such as an accelerometer, gyroscope, pressure sensor, humidity sensor, or the like. Exemplary applications that may use a capacitive interface circuit in accordance with this disclosure include physiological monitoring applications, such as monitoring of posture, activity, gait, intravenous pressure, intracranial pressure, heart sounds, humidity, liquid level, and the like. A capacitive interface circuit, as described herein, also may be useful in industrial or environmental monitoring applications, especially where very low power consumption is desirable.

In general, a capacitive interface circuit, as described in this disclosure, may be configured for very low power applications. Such low power applications include a variety of medical and non-medical measurement applications. An implantable medical device (IMD), for example, may be characterized by a finite power source that is required to last for several months or years. In some cases, the IMD may deliver a life sustaining therapy, such as cardiac pacing or defibrillation, based on sensor input. Alternatively, the IMD may provide a variety of other beneficial therapies such as neurostimulation, e.g., for spinal cord stimulation, pelvic floor stimulation, deep brain stimulation, gastric stimulation, or peripheral nerve stimulation. A sensor may be included in an IMD housing, lead or catheter. A sensor associated with an IMD may be required to draw very low power, yet provide precise and accurate measurement. Accordingly, it is desirable that sensing and therapy circuits associated with an IMD consume very small levels of power to promote device longevity. As an example, operation of a sensor incorporating a capacitive interface circuit, as described in this disclosure, may require a supply current during continuous or periodic sensing in a range of approximately 100 nanoamps to approximately 2.0 microamps, and more preferably approximately 500 nanoamps to approximately 1.0 microamps. Sensors operating within these ranges may generally be referred to as micropower sensors.

According to various embodiments of this disclosure, a capacitive interface circuit may include a differential amplifier and a sampling capacitor coupled to the output of the differential amplifier. The capacitive interface circuit operates uses correlated triple sampling (CTS) signal processing techniques to substantially eliminate kT/C noise, amplifier offset, and 1/f (flicker) noise from the output. As the name suggests, CTS is a three-step process. The first two steps occur during a first clock phase and the third step occurs during a subsequent second clock phase. Generally, the CTS process substantially removes or eliminates the signal components from the output of the amplifier that do not change between a first clock phase and a subsequent second clock phase. The kT/C noise, amplifier offset, and flicker (1/f) noise do not change between the first and second clock phase. Thus, these noise components are substantially eliminated from the output of the amplifier by the CTX process.

The first step is referred to as the reset step which resets the sensor node while the sampling capacitor is tied to a system ground. During the second step, referred to as the sampling step, kT/C noise from the variable sense capacitors is sampled onto the sampling capacitor through the differential amplifier. Offset and flicker noise are added to the kT/C noise by the differential amplifier and collectively stored on the sampling capacitor.

The third step is referred to as the sensing step and involves applying a sensor signal to the differential amplifier. The differential amplifier amplifies the sensor signal to produce an output signal that includes an amplified representation of the sensor signal and a noise component. The sensor signal follows the same signal path as the kT/C noise during the sampling step, the noise component of the differential output in the third step includes kT/C noise, amplifier offset, and flicker noise. Thus, the noise stored on the sampling capacitor substantially eliminates the noise component of the output signal produced by the differential amplifier during the sensing (third) step.

The capacitive interface circuit may also include an output stage that includes two interleaved sample-and-hold (S/H) stages. This output stage may be referred to as a ping-pong demodulator. In operation, one stage of the ping pong demodulator (ping stage) samples the output of the differential amplifier during a first clock cycle, while the other stage (pong stage) outputs a signal at the same time. The signal output by the pong stage is based on the output of the differential amplifier during the previous clock cycle. During a second clock cycle that follows the first cycle, the ping stage outputs a signal based on the signal sampled during the first clock cycle and the pong stage samples the current output of the differential amplifier. In this manner, the two stages of the ping pong demodulator alternately sample the output of the differential amplifier and hold it for one clock cycle before outputting the signal. Holding the signal enables transients in the signal to settle so that the signal output by the ping pong demodulator reduces glitching and is more stable.

In addition, the capacitive interface circuit may provide negative feedback to apply a counter charge that limits the signal. The negative feedback may be applied at the input to the output stage (ping pong demodulator) or applied as global feedback to the input to the differential amplifier in order to keep the signal small. The feedback can be applied to both inputs of the differential amplifier to provide differential-to-single ended conversion. Furthermore, the capacitive interface circuit may include additional signal processing circuitry, such as an analog-to-digital converter (ADC). In such embodiments, the negative feedback may be applied as discrete global feedback.

A capacitive interface circuit, in accordance with various embodiments of this disclosure, may produce a stable, low noise signal while operating with very low power. The circuit achieves low power by substantially eliminating noise and, more specifically, kT/C noise, from the output without requiring fast circuit dynamics, i.e., operating at fast clock rates that draw more power. In fact, the circuit may operate with a clock rate of less than or approximately equal to 500 Hz and, more preferably, approximately 200 Hz to approximately 300 Hz.

Various example embodiments are presented. According to some embodiments, which is useful when the sensor interface nodes are isolated, the interface circuit is configured so that a common plate can be driven and the differential interface extracts the signal voltage which is proportionate to the difference in capacitance of the sense capacitors. This embodiment is useful for sensor architectures used for micromachined accelerometers.

According to other embodiments, which represents a modification of the previous example embodiment, the interface circuit is configured to accommodate sensors that require one side of the differential plates of the sense capacitors to be held at common potential, e.g., a system ground. This latter example embodiment may be useful for pressure sensor architectures and may be extended to many capacitive sensor applications, such as humidity sensors and liquid level detection.

As mentioned previously, a capacitive interface circuit may be useful in conjunction with physiological sensors associated with IMDs. In these cases, it is important that the sensor provide low noise performance so that noise does not result in reduced sensitivity or produce incorrect or misleading diagnostic information. It is also important that the sensor operate with low power in order to conserve limited battery resources and thereby promote operational longevity, particularly. A micropower sensor, as described in this disclosure, includes a sensor, such as a MEMS-based sensor, and a capacitive interface circuit configured to achieve stable, precise measurements with low power. Capacitive interface circuitry and associated sensor circuitry may be useful in a wide variety of applications. For purposes of illustration, however, use of such circuitry will be generally described in this disclosure in the context of medical applications.

FIG. 1 is a block diagram illustrating a micro-electromechanical system (MEMS) sensor 2 that allows for measurement of capacitance fluctuations with high resolution and low power. As shown in FIG. 1, MEMS sensor 2 may include a capacitor-based sensor 4 and a sensor interface 6 that interfaces with the sensor. MEMS sensor 2 may achieve accurate and stable measurement by substantially reducing or eliminating kT/C sampling noise, as well as amplifier offset and flicker (1/f) noise, and reducing transients in the signal. Moreover, in some embodiments, MEMS sensor 2 may be configured to achieve this performance while operating at a low clock rate, e.g., less than or equal to approximately 500 Hz, approximately 200 Hz to 300 Hz, and more preferably approximately 250 Hz. As a result, in some embodiments, MEMS sensor 2 can operate under the constraints of a micro power system, e.g., draw approximately 100 nanoamps to approximately 2.0 microamps, and more preferably approximately 500 nanoamps to approximately 1.0 microamps of current from a power source.

For purposes of illustration, but without limitation, MEMS sensor 2 is generally described in this disclosure as an accelerometer that enables physiological inertial sensing in a chronically implanted device, i.e., an implantable medical device (IMD). Physiological inertial sensing is important because a patient's disease state or therapy disposition can be represented or indicated by activity and posture. For example, delivery of some therapies may be controlled according to the activity, activity level, or posture of a patient, or with respect to detection of a disease state such as tremor or seizure in the cases of movement disorders or epilepsy. Accordingly, information provided by inertial sensing is useful for diagnostic purposes and implementation of control loops for delivering therapy. For example, a chronic single axis MEMS sensor may be used for adjusting cardiac pacing rate based on a patient's activity level. As another example, a multiple axis MEMS accelerometer may be used for adjusting therapy, such as neurostimulation therapy, based on a patient's posture, i.e., sitting, standing, lying down, or the like. When implanted within a patient, however, MEMS sensor 2 should operate as a micropower system to conserve limited battery resources thereby promoting operational longevity of the IMD. MEMS sensor 2 should also maintain an acceptable noise floor, i.e., low noise performance, so that noise does not cause reduced sensitivity or cause the signal to appear to show incorrect or misleading diagnostic information.

In order to operate within the power limitations of a micropower system, MEMS sensor 2 should be clocked at approximately 500 Hz or less. However, because of the size restrictions on the sense element of a MEMS sensor, the change in capacitance of the variable capacitors is small, e.g., approximately hundreds of fFs to 100 aF or less. Thus, the output voltage range of a micropower MEMS sensor may be approximately 10 μV to approximately 1 mV when a feedback capacitance associated with the sensor circuit is approximately the same size as the sense capacitance. At this small output voltage range, the signal at the output of a MEMS sensor includes kT/C noise as well as amplifier offset and flicker (1/f) noise from the amplifier. The kT/C noise is caused by resetting the sensor node during the sampling process. These noise components can dominate the signal voltage thereby undermining the accuracy and performance of the MEMS sensor.

MEMS sensor 2 utilizes a correlated triple sampling (CTS) process to substantially eliminate kT/C noise, amplifier offset, and flicker (1/f) noise from the sensor signal. The CTS process does not require the clock rate to be increased and, thus, enables MEMS sensor 2 to operate under the power constraints of a micropower system. MEMS sensor 2 also includes an output stage for reducing transients in the signal chain to generate a stable output signal. The CTS process and output stage are described in greater detail below.

In the example of FIG. 1, MEMS sensor 2 includes sensor 4 and sensor interface 6 packaged on a substrate 8. Sensor 4 may be fabricated using MEMS technology which uses micromachining processes to selectively etch away parts of the silicon substrate or add new structural layers to form mechanical and electromechanical devices. MEMS technology integrates mechanical elements, sensors, actuators, and electronics on a common silicon substrate. Sensor interface 6 may be fabricated using integrated circuit processes and may be coupled to sensor 4 via industry standard wirebonds.

Sensor 4 and sensor interface 6 may be separate discrete components on substrate 8. Sensor 4 may, for example, be an off-the-shelf MEMS sensor, such as a micromachined single or multiple axis accelerometer. In this way, the architecture of MEMS sensor 2 can partitioned to re-use existing sensor technology to leverage commercial volumes thus ensuring high reliability and low cost. Reliability may be particularly important for sensor 4 if MEMS sensor 2 is used for monitoring of physiological signals, such as patient posture and activity, in conjunction with an IMD.

Sensor interface 6 may be a specially designed component that provides a self-contained interface for reliable precision sensing at low power. In the embodiment shown in FIG. 1, sensor interface 6 is designed to transduce small capacitive deflections from sensor 4 into a stable, precise analog output signal with low power. Sensor interface 6 may be manufactured separately from sensor 4, but calibrated and tested for operation with sensor 4. When sensor interface 4 is received from the manufacturer, sensor 4 can be packaged on substrate 8 with sensor interface 6.

In an exemplary embodiment, sensor 4 and sensor interface 6 may be molded into land grid array (LGA) package on substrate 8. As an example, the LGA package may have dimensions of approximately 3 millimeter (mm) in width, by approximately 3 mm in length, by approximately 1 mm in thickness. The LGA package protects sensitive high impedance nodes of MEMS sensor 2 from environmental aggressors such as electrostatic discharge (ESD). MEMS sensor 2 may also be designed to be shock resistant to more than 10 kG. As a result, MEMS sensor 2 may withstand abusive drops, such as dropping MEMS sensor 2 during a surgical implant procedure.

The LGA package may be hermetically sealed in a wafer-to-wafer bonding step. A "cap" may be formed over substrate 8 to protect sensor 4 and sensor interface 6 from moisture, plastic, and other contaminants in package manufacturing. The cap also may serve as a substrate for die stacking sensor interface 6 for small form factors in some embodiments. In an example embodiment, sensor 4 may be held in a gas mixture that facilitates maintaining a finite sensor quality factor, Q, at resonance and provides nonlinear squeeze-film damping in the presence of shock. The sensor Q may be on the order of 8.

As described in FIG. 1, MEMS sensor 2 is generally implemented as part of an IMD. In one example, MEMS sensor 2 may be contained within the IMD housing, sometimes referred to as a "can," or located on the device housing. In another example, MEMS sensor 2 may be located within a lead or catheter that extends from the IMD, e.g., at the distal tip or at some point along the length of such a lead or catheter. In this case, MEMS sensor 2 may be electrically coupled to an IMD via electrical conductors in the lead that extend between MEMS sensor 2 and the device can. This example embodiment may be useful when MEMS sensor 2 is a pressure sensor used for monitoring heart sounds. The lead may include conductors and electrodes for delivery of electrical stimulation and/or sensing. A catheter may include an inner lumen to deliver or withdraw fluids from a region within the body, and may include one or more conductor coupled to sensor 2. Alternatively, sensor 2 may be equipped for wireless telemetry of sensor signals.

In general, sensor 4 converts mechanical energy into an analog output voltage that is processed by sensor interface 6 to generate an output signal. For example, sensor 4 may be implemented as a micromachined three-axis accelerometer that allows for inertial measurement with minimal area, power penalty, and routing concerns by converting three axes of acceleration into three independent analog channels. Hence, sensor interface 6 may include multiple interface circuits, each of which may be dedicated to one of the three axes. The three axes of acceleration may be aligned to the package dimensions, i.e., in the x, y, and z directions (length, width, and height). A suitable, exemplary process for fabrication of sensor 4 is the THELMA (Thick Epi-Poly Layer for Micro-actuators and Accelerometers) process developed by ST Microelectronics, although other MEMS processes may be used.

The architecture for the accelerometer may comprise, in some embodiments, a single lateral accelerometer for measurement of x and y acceleration, while measurement of acceleration along the z-axis may be measured using a differential teeter-totter arrangement. Other configurations are possible for sensor 4. Accordingly, the particular architecture described in this disclosure is exemplary as one of many possible configurations and should not be considered limiting in any way. However, with respect to the example configuration described in this disclosure, each axis of the accelerometer may use differential capacitors formed by interdigitated beam fingers to transduce acceleration into an analog output voltage. The interdigitated fingers act as capacitor plates that are electrically connected to form variable, differential capacitors. A proof mass is coupled to one set of the interdigitated fingers, referred to as the beam fingers, and suspended over the substrate by a spring. The capacitance between a beam finger attached to the proof mass and one of the corresponding fixed fingers changes as the proof mass deflects in a particular direction. The change in capacitance indicates acceleration in a particular direction. Accordingly, sensor 4 may be modeled by an equivalent set of capacitors in which the overlapping area of the plates or spacing between the plates is a function of the displacement of the sense element.

Sensor interface 6 is coupled to sensor 4 and translates the change in capacitance to a voltage that is processed to produce sensor signals that represent measurement of motion. As previously described, the capacitance of the variable capacitors is typically within a range of approximately hundreds of fF and exhibit variation on the order of approximately 1-100 aF. As a result, the voltage sensed by sensor interface 6 may be within a range of approximately 10 μV to 1 mV. If MEMS sensor 2 operates as a micropower system, i.e., operates with a clock rate of approximately 500 Hz or less and draws less than approximately 2.0 microamps of current form a power source, kT/C noise and other errors, such as amplifier offset and flicker (1/f) noise, can dominate the signal voltage. Sensor interface 6, however, employs correlated triple sampling (CTS) to substantially eliminate or remove imperfections, i.e., kT/C noise, amplifier offset, and flicker noise, from the signal.

As mentioned previously, CTS is a sampling process that eliminates signal components that do not change between the two clock phases of a clock cycle. In particular, CTS involves sampling a noise signal during the first clock phase and sampling a sensor signal during the second clock phase. Because the sensor signal follows the same signal path as the noise signal, the noise components, e.g., kT/C noise, amplifier offset, and flicker noise, are common to both signals. Consequently, kT/C noise, as well as amplifier offset and flicker noise, can be removed from the sensor signal by cancellation. In this manner, sensor interface 6 produces a low noise sensor output signal.

Sensor interface 6 provides the interface for the CTS process. The interface includes a differential amplifier, a sampling capacitor, and a plurality of switches. Generally, the inputs of the differential amplifier are coupled to sensor 4 through a pair of switches. The output of the differential amplifier is coupled to one end of the sampling capacitor. The other end of the sampling capacitor is coupled to a switch. In this manner, the switches are located at various nodes in the signal path and can be driven by respective clock signals to control the sequence of steps of the CTS process.

Again, the CTS process is a three step process. The first two steps sample a noise signal and occur during the first phase of a clock cycle. The third step samples the sensor signal and occurs during the second phase of the clock cycle. The first step, also referred to as the reset step, resets the sensor node during a first portion of the first clock phase of the clock signal. The sampling capacitor is also tied to ground during the first step. In other words, the differential amplifier in sensor interface 6 is disconnected from sensor 4 during the first step to build up kT/C noise on the variable sense capacitors.

During the second step, which occurs during a second portion of the first clock phase, the differential amplifier is connected to the variable sense capacitors and the kT/C noise is sampled onto the sampling capacitor through the differential amplifier. The amplifier also introduces offset and flicker noise into the signal, which are collectively stored on the sampling capacitor with the kT/C noise.

The third step is initiated by the second phase of the clock cycle and is referred to as the sensing step. As the name of this step suggests, the sensor signal is applied across the variable capacitors to the differential amplifier. The differential amplifier amplifies the amplitude of the voltage signal to produce an amplified signal. The amplified signal includes an amplified representation of the sensor signal and a noise component.

Because the sensor signal follows the same signal path as the kT/C noise during the sampling step, kT/C noise, amplifier offset, and flicker noise are common between the two clock phases. That is, the noise component of the amplified signal is substantially the same as the signal stored on the sampling capacitor during the sampling step. Thus, the noise signal stored on the sampling capacitor during the sampling (second) step substantially eliminates the noise component of the amplified signal produced by the differential amplifier during the sensing (third) step.

The resulting signal, however, still may contain transients, i.e., glitches, that are caused by fast dynamics in the signal chain. Accordingly, sensor interface 6 may include an output stage coupled to the sampling capacitor that suppresses the clock transients. The output stage includes two interleaved sample-and-hold (S/H) stages and may be referred to as a ping-pong demodulator. One stage of the ping-pong demodulator (ping stage) samples the output of the differential amplifier during a first clock cycle and, more specifically, during the third step of the CTS process during the first clock cycle while the other stage (pong stage) outputs a signal at the same time. The signal output by the pong stage is based on a signal sampled from the differential amplifier during the third step of the CTS process from the previous clock cycle.

During a second clock cycle that follows the first clock cycle, the ping stage outputs a signal based on the signal sampled during the first clock cycle, while the pong stage simultaneously samples the output of the differential amplifier. In this way, the ping pong demodulator alternately samples the output of the differential amplifier and holds it for one clock cycle before outputting the signal at the following clock cycle. Holding the output for one clock cycle allows the transients (glitches) in the signal to settle. As a result, the output of sensor interface 6 in MEMS sensor 2 is a stable, low noise signal.

The output stage also may be configured to provide negative feedback that keeps signal change small. The feedback may be applied to the input of the output stage or, alternatively, may be applied globally to the input of the differential amplifier. When the feedback is applied as global feedback, the feedback is differentially applied to the inputs of the differential amplifier to provide differential-to-single ended conversion. The global feedback may be applied as analog feedback or as discrete feedback. In the case of discrete feedback, sensor interface 6 may include an analog-to-digital converter (ADC).

In addition to the circuitry for the CTS process and output stage, sensor interface 6 may include supporting circuitry. For example, sensor interface 6 may include a clock state machine, a reference and bias voltage generator, and on-chip trim memory for trimming offset and sensitivity. The on-chip memory may store trim codes written in non-volatile memory during production to eliminate the need to track data through manufacturing. In particular, the trim codes may be used by sensor interface 6 to calibrate measurements obtained from sensor 4. Furthermore, interface circuit may provide an electro-static self-test that is used for determining the operability of MEMS sensor 2. The self test command may be useful in the manufacturing process to determine if MEMS sensor 2 is operational before shipping to a vendor. The self-test command may also be useful for validating operation of MEMS sensor 2 when it is implanted within a patient and used for monitoring physiological signals.

The output of sensor interface 6 may be passed to additional processing circuitry off the chip, i.e., outside the LGA package. The additional circuitry may, for example, be a processor within an IMD or other device that processes the output of MEMS sensor 2. For example, a processor within an IMD may process the sensor output signal to identify characteristics in the signal that can be used for diagnostic purposes or to implement control loops for delivering therapy.

Although MEMS sensor 2 is described in this disclosure as providing sensing of physiologically-based motion, MEMS sensor 2 is not limited in this way. Instead, it should be understood that MEMS sensor 2 and, more particularly, sensor interface 6, may be adapted to various medical and non-medical applications. For example, sensor 4 may be any capacitive based sensor that can provide useful sensor data when used in conjunction with sensor interface 6. Accordingly, sensor 4 may be a gyroscope, a pressure sensor, a microactuator, or other type of inertial, chemical, or magnetic sensor fabricated using MEMS technology, including combinations of such sensors. MEMS sensor 2 may also be used in catheter monitoring applications with pressure sensors, monitoring of heart sounds with pressure sensors, and other physiological monitoring applications that require micropower systems for precision measurements, such as acceleration, pressure, humidity, and liquid level.

Figure 2:
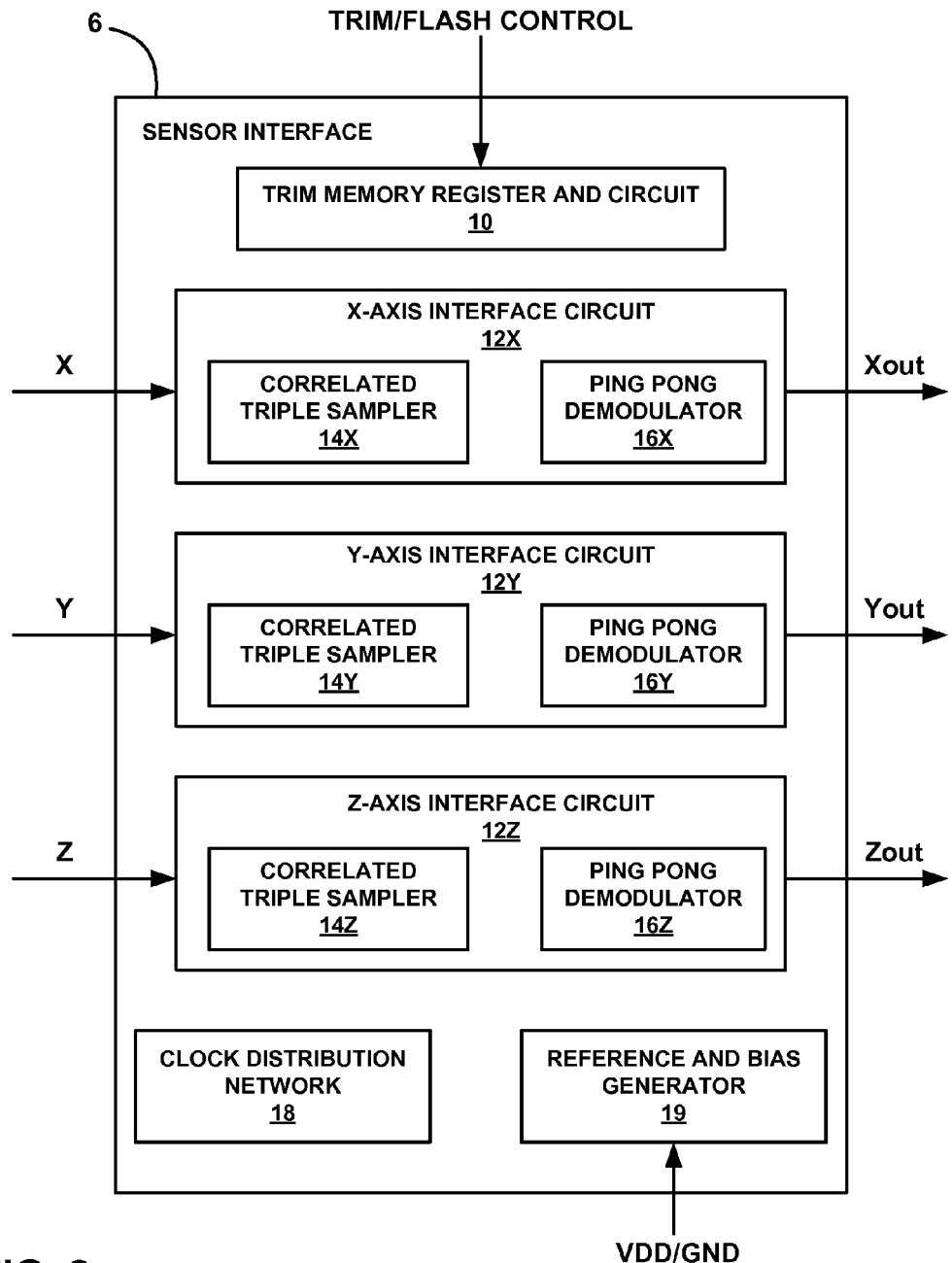
FIG. 2 is a block diagram illustrating an interface circuit for use in the sensor device of FIG. 1.

FIG. 2 is a block diagram illustrating various components of sensor interface 6 of FIG. 1 in greater detail. As shown in FIG. 2, sensor interface 6 includes interface circuits 12X, 12Y, 12Z, trim memory register and circuit 10, clock distribution network 18, and reference and bias generator 19. In the example of FIG. 2, interface circuits 12X-12Z (collectively "interface circuits 12") convert three axes of acceleration (X, Y, and Z) into three independent analog output channels ($X_{OUT}$, $Y_{OUT}$, and $Z_{OUT}$). Hence, each of interface circuits 12 corresponds to one of the X, Y and Z sensing axes. Each of interface circuits 12 may include a corresponding correlated triple sampler 14X-14Z (collectively "correlated triple samplers 14") and a corresponding ping pong demodulator 16X-16Z (collectively "ping pong demodulators 16"), respectively.

Figure 4:
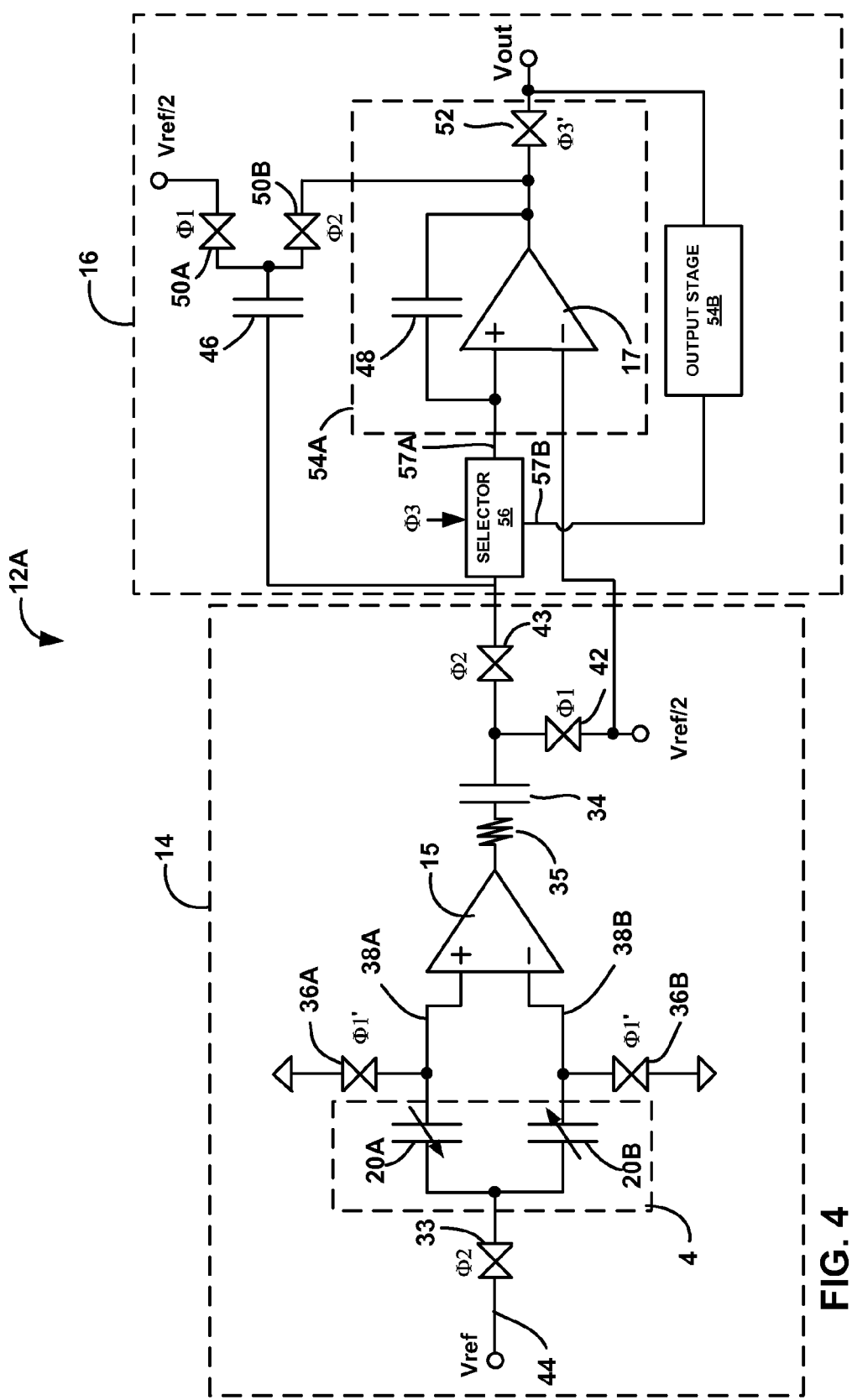
FIG. 4 is a circuit diagram illustrating one example of an interface circuit for use in the sensor device of FIG. 1.
Figure 5:
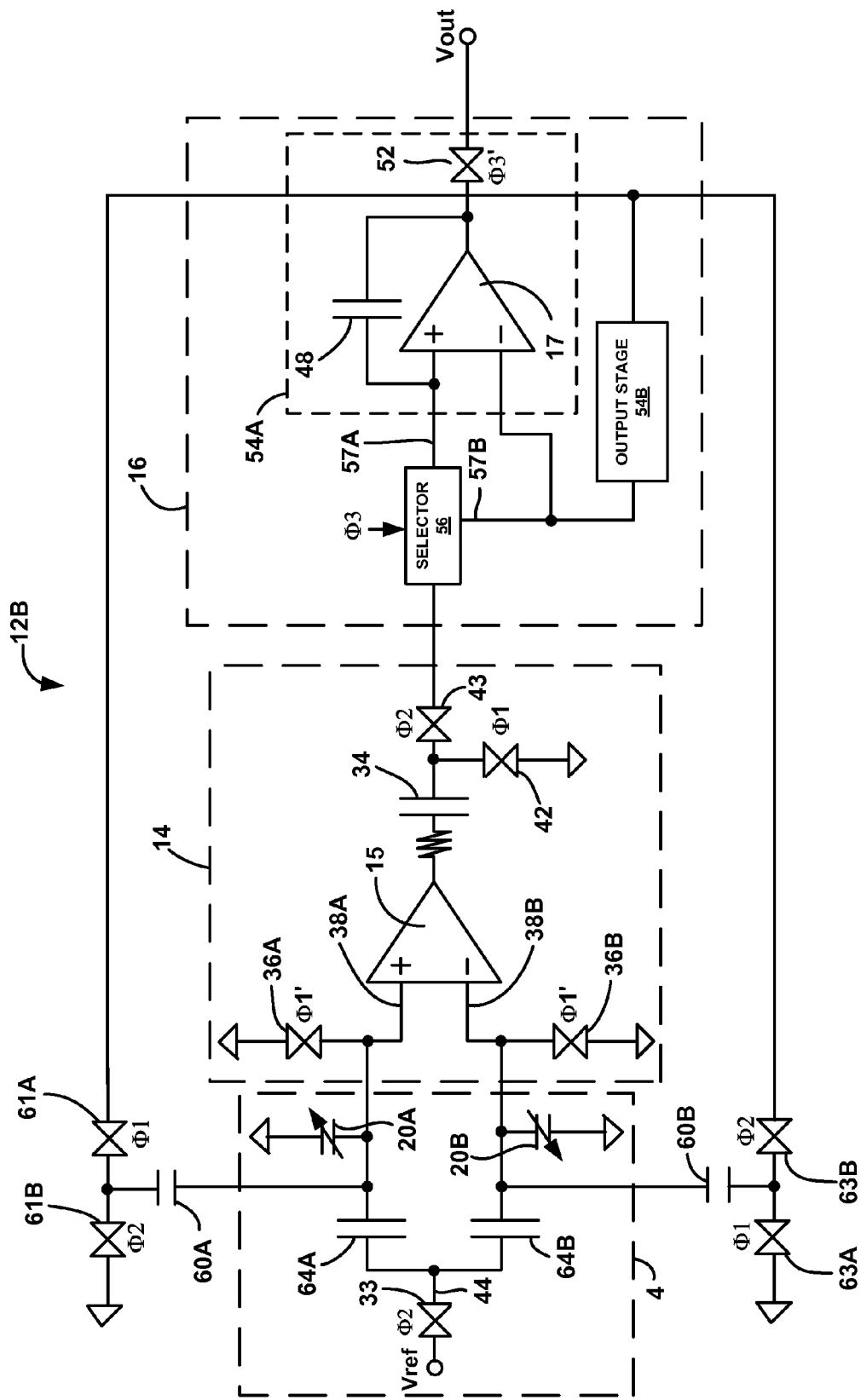
FIG. 5 is a circuit diagram illustrating another example of an interface circuit for use in the sensor device of FIG. 1.
Figure 6:
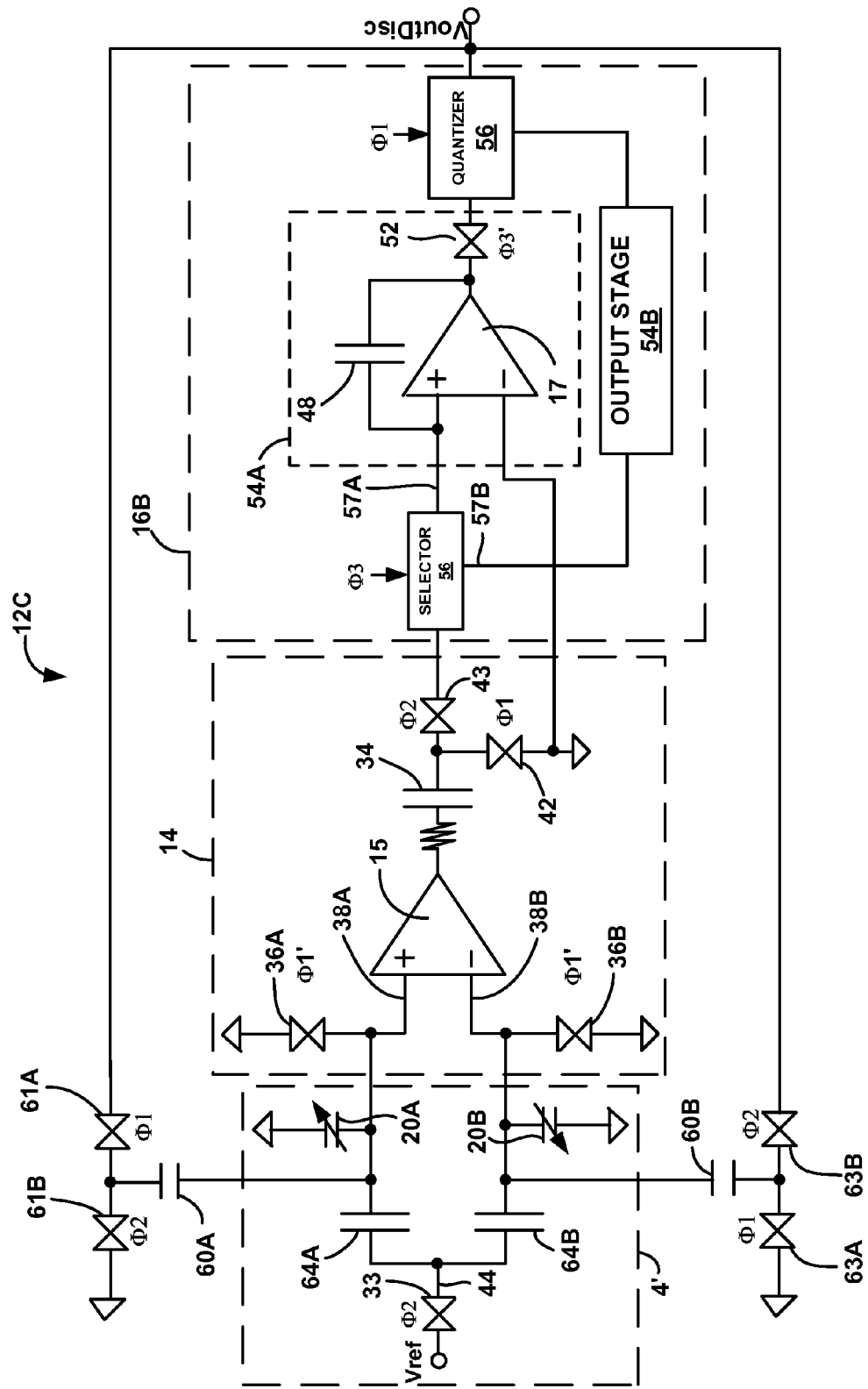
FIG. 6 is a circuit diagram illustrating yet another example of an interface circuit for use in the sensor device of FIG. 1.
Figure 9:
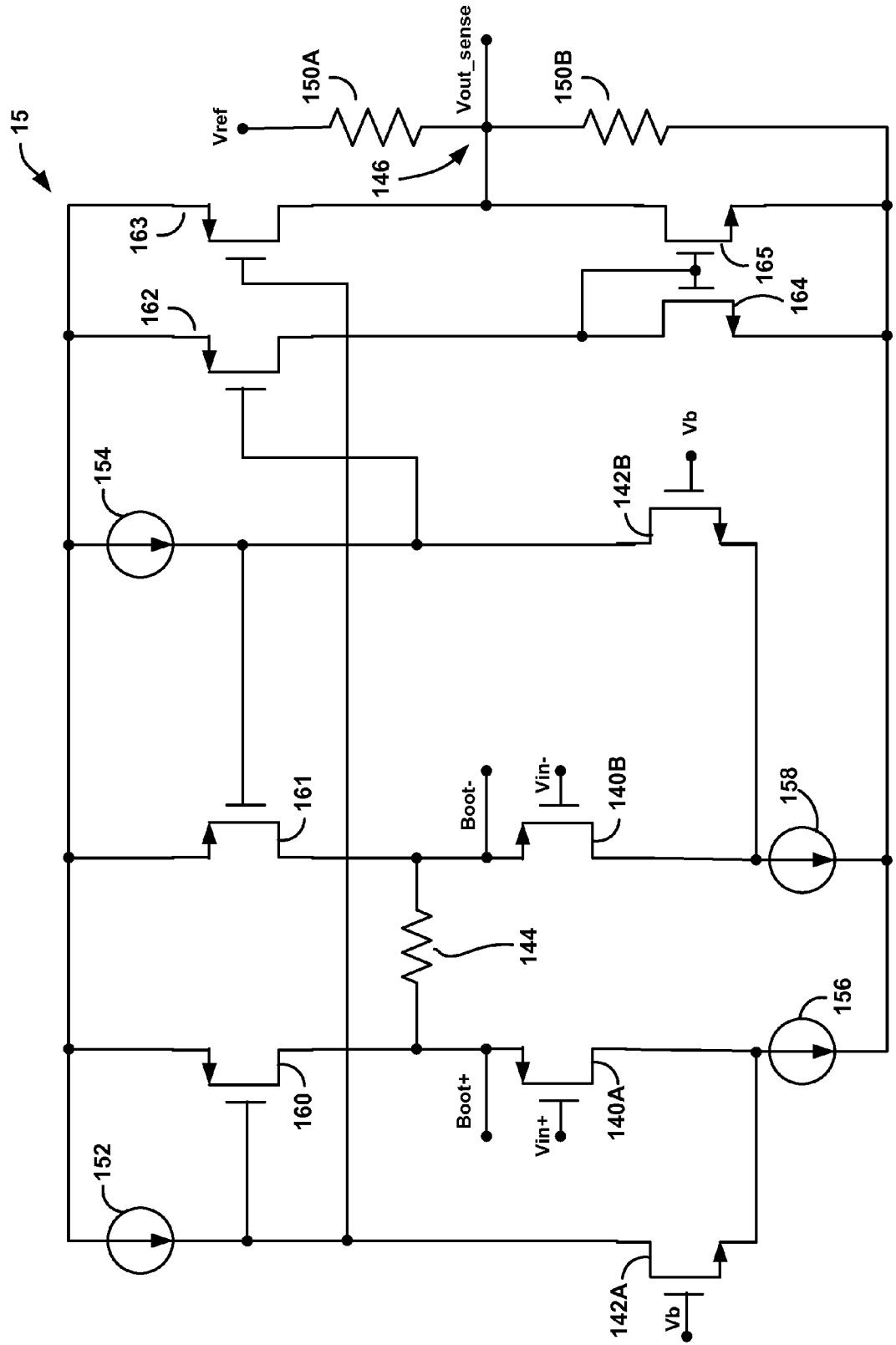
FIG. 9 is a circuit diagram illustrating circuitry for an instrumentation amplifier for use in the interface circuit of any of FIGS. 4-6.

Each of correlated triple samplers 14 produces a low noise signal at its output and includes a differential amplifier and a sampling capacitor coupled to the output of the differential amplifier. The differential amplifier may be an instrumentation amplifier with a fully differential architecture that interfaces with sensor 4 to reject common mode signals and leakage current. The instrumentation amplifier may comprise a low-power instrumentation amplifier with stable gain characteristics, good linearity, and wide common-mode range. An exemplary instrumentation amplifier is illustrated in FIG. 9. Circuit diagrams of exemplary correlated triple samplers are illustrated in FIGS. 4, 5, and 6.

Each of ping-pong demodulators 16 receives the low noise signal produced by the corresponding one of correlated triple samplers 14 as an input and outputs a corresponding stable, low noise signal. Ping-pong demodulator 16 samples and holds an output of the sampling capacitor 34 in first and second output stages 54A, 54B on an alternating basis. At the input of ping pong demodulators 16, the low noise signal may include transients that are caused by fast switching dynamics in the signal path. Ping pong demodulators 16 each include a pair of interleaved output stages that alternately sample the output of the corresponding one of correlated triple samplers 14 during a clock cycle and output the signal during the following clock cycle. In this way, ping pong demodulators 16 allow the transients in the signal to settle, e.g., for one clock cycle, before applying the resulting stable, low noise signal to additional processing circuitry. As previously described, the additional processing circuitry may include an ADC located on sensor interface 6 (not shown) or circuitry located off of sensor interface 6, such as circuitry associated with the IMD that identifies characteristics in the signal that can be used for diagnostic purposes or implementing control loops for delivering therapy. A circuit diagram of an example ping pong demodulator is provided in FIG. 7.

Trim memory register and circuit 10 may include electrically erasable programmable read only memory (EEPROM) cells or other cells of non-volatile memory that store trim calibration codes. In-package memory, such as EEPROM cells, allow for sensor device 2 to be calibrated on a high volume production line and then transferred for assembly as part of an IMD that delivers therapy to a patient and uses output generated by sensor device 2 in a therapy delivery algorithm, for diagnostic purposes, or both.

In some embodiments, trim memory register and circuit 10 may include an offset trim block comprising a capacitor digital-to-analog converter (DAC) that injects charge onto the sensor nodes, thereby emulating a larger passive coupling capacitance between the clock and the amplifier. This capacitance is independent of the acceleration force.

An exemplary offset trim block may include reset switches required to null the sensor nodes during the reset phase of the sensor clock. The absolute magnitude of the injected charge may be determined by integrated poly-poly caps, driven by the sensor clock. A binary weighted capacitor DAC code determines the relative magnitude of the injected charge and to which plate the charge is routed. The DAC code may be obtained from trim memory register 10.

Clock distribution network 18 creates the signal chain and sensor clocking on-chip from a single master external clock. The master external clock may be located off of sensor interface 6 and associated with processing circuitry for the IMD that uses the output of sensor interface 6. Clock distribution network 18 may, for example, create one or more clock signals to control correlated triple samplers 14 and ping pong demodulators 16. That is, clock distribution network 18 may create clock signals that drive switches positioned at various nodes within the signal chain to control the sequence of steps of the CTS process.

For example, the nominal clock frequency for the signal chain may be approximately 1 kHz, which is partitioned by clock distribution network 18 into the phasing necessary to drive correlated triple samplers 14 and ping pong demodulators 16. A clock driver for exciting sensor 4 may include a negative charge pump that clocks sensor 4 to −AVDD on the sensor reset clock, and +AVDD on the read-out portion. Significant capacitive loading on sensor 4 may limit the negative clock to approximately 80% of AVDD when using an on-chip capacitor that can fit into the sensor package. This amount of drive is sufficient for meeting the noise requirements.

Reference and bias generator 19 provides reference and bias voltages for MEMS sensor 2. For example, generator 19 may supply reference voltages to sampling capacitors in correlated triple samplers 14 and bias voltages to active circuit elements in interface circuits 12, such as the differential amplifiers in correlated triple samplers 14 and amplifiers in the S/H circuits in ping pong demodulators 16.

The following description provides general part specifications of an exemplary MEMS sensor. For example, an approximate maximum size of an ASIC forming sensor interface 6 may be approximately 2,100 μm, by approximately 1,300 μm, hams and scribes not included. The sensor die may be approximately 2,100 μm, by approximately 1,900 μm. Sensor 4, protective cap, and ASIC-based sensor interface 6 may be die stacked and placed in an industry standard land grid array (LGA). In an exemplary embodiment, the dimensions of the LGA package may be approximately 3 mm in length, by approximately 3 mm in width, by approximately 1 mm in height.

Reference and bias generator 19 may be supplied with a nominal supply voltage for sensor interface 6 and a maximum supply voltage for programming trim memory register 10. The nominal supply voltage and maximum supply voltage may, for example, be 1.9 V (+/−5%) and 14 V, respectively. The minimal supply voltage may be extended to 1.7V functionality, with some potential derating of the specifications for sensitivity and offset. The nominal supply current for MEMS sensor 2 may be a maximum of approximately 1 uA for continuous measurement of three axis of acceleration. MEMS sensor 2 may also operate with also be a low-power mode that lowers the current to approximately 500 nA. These values are merely exemplary and should not be considered limiting in any way.

Additionally, there may also be a "sonogram mode" to measure cardiac sonograms along the z-axis that draws a different amount of current than the normal-mode, or low-power mode. The requirement driver for the sonogram mode is 5 mg root-mean-square (rms) noise with a minimum 50 Hz bandwidth. The nominal clock frequency for the signal chain is approximately 1 kHz, which is partitioned by a small state machine into the phasing necessary to drive the sensor and the ping-pong demodulation amplifier. The clock driver for exciting the sensor includes a negative charge pump, so that the sensor is clocked to −AVDD on the sensor reset clock, and then +AVDD on the read-out portion. In practice, the significant capacitive loading on the sensor (e.g., approximately 6 pF) limits the negative clock to approximately 80% of AVDD when using an on-chip capacitor that can fit into the sensor package. This amount of drive is sufficient for meeting the noise requirements.

The following briefly describes the nature and function of each of the signals available at bonding pads (not shown) on sensor interface 6. Sensor interface 6 may include six differential sensing pads, X+, X−, Y+, Y−, Z+, Z−, a common "rotor" drive COM, and two ground pads GND that are routed to all sensors. The electrodes may be placed along the top of sensor interface 6. The ordering of the electrodes may be GND: Z+: Y+: X+: COM: X−: Y−: Z−: GND. The pad pitch may be approximately 110 um. The COM pad centerline may be coincident with the centerline of sensor interface 6, spaced approximately 1050 um from each edge.

To reduce input capacitance, there may be no electrostatic discharge (ESD) cells on these pads in some embodiments. ESD protection on the sensor pads may be provided by series 500 kW resistors sized for 2 kV HBM (human body model). The switch diffusions on the core protect the IC gates. The bond pads may be bootstrapped by the sources of sensor interface 6 to lower capacitive load of the sensor.

A VSS and Vref pad provide a ground reference and a reference voltage, respectively. Sensor interface 6 may also include pads for analog outputs, e.g., $X_{OUT}$, $Y_{OUT}$, and $Z_{OUT}$. The analog outputs $X_{OUT}$, $Y_{OUT}$, $Z_{OUT}$ provide three different channels for accelerometer signals along three different axes (X, Y and Z). The signal voltage may be centered about Vref/2 and the sensitivity may be ratiometric to Vref. This allows for the use of a ratiometric ADC for robust sensing. Vref may be tied to AVDD for ratiometric operation, or to a bandgap for an absolute reference. The output of sensor interface 6 may be able to source a minimum of approximately 50 nanoamps.

Sensor interface 6 may include an additional four pins through a serial 12C port for programming the EEPROM cells of trim memory register and circuit 10, providing the data, and for selecting whether trim codes come from volatile registers or from the EEPROM in trim memory 10, respectively. Six bits of offset may be allocated to each axis for offset, and an on-chip digital-to-analog converter (DAC) (not shown) may deliver the offset charge to the sensor interface node. The offset for each axis may be trimmed to within 0.25 G. Final calibration may be performed after implant of an IMD based on final orientation of sensor 4 with respect to earth. The sensitivity trim may adjust the scaling on output and hold capacitors in ping pong demodulators 16, and may set a net tolerance of 50 mV/G/Vdd+/−5%, where Vdd is the supply voltage The target noise of the sensor channel may be approximately 500 µg/rtHz in X and Y, and 750 µg/rtHz in Z, for a sensor excitation voltage of approximately 2.4V (2× bandgap). This will provide a nominal noise floor of approximately 2 mg-rms in X and Y and 3 mg-rms in Z for posture detection (10 Hz bandwidth, first order lowpass). In some embodiments, the desired estimated noise floor requirement may be 10 mg-rms in a 10 Hz bandwidth. The targeted lower noise floor may capture the extreme process corners of a MEMS process without compromising the power specification. MEMS sensor 2 may include a trim for decreasing the quiescent current, if the MEMS process stability is found to not require the design margin.

In embodiments in which MEMS sensor 2 includes a pressure sensor for measuring cardiac sounds, the Z-axis may also have a boost mode that decreases the noise floor. In combination with a faster clock, the boost mode may provide approximately a 5 mg-rms noise floor with a 100 Hz effective noise bandwidth. This mode may be used for monitoring cardiac sonograms in IMD applications.

The nominal bandwidth requirement for the X and Y accelerometer channel may be approximately 20 Hz (−3 dB point). The minimum bandwidth for the Z accelerometer channel may be approximately 50 Hz (−3 dB point) to allow for the measurement of cardiac sounds. Additionally, the low-pass characteristic may be first-order and determined by capacitor ratios and the system clock in the output stages of interface circuits 12.

The cross-axis sensitivity of the accelerometer used for sensor 4 between X, Y and Z axes may be under approximately 5%. The dominant error in cross-axis sensitivity is package alignment. The non-linearity of MEMS-based sensor device 2 may be less than approximately 5% for a specified range of +/−6 G. The absolute offset of sensor 4 may be trimmed to +/−0.5 G/s. When implemented as an accelerometer within a patient to detect posture of the patient, the orientation of sensor 4 should be calibrated in the patient for posture. Thus, as long as the dynamic range is acceptable, the absolute offset may not be critical. However, the offset of the accelerometer preferably should not drift more than +/− 100 mG over a temperature range of approximately 37 C+/−5 C and over the lifetime of the sensor.

Figure 3:
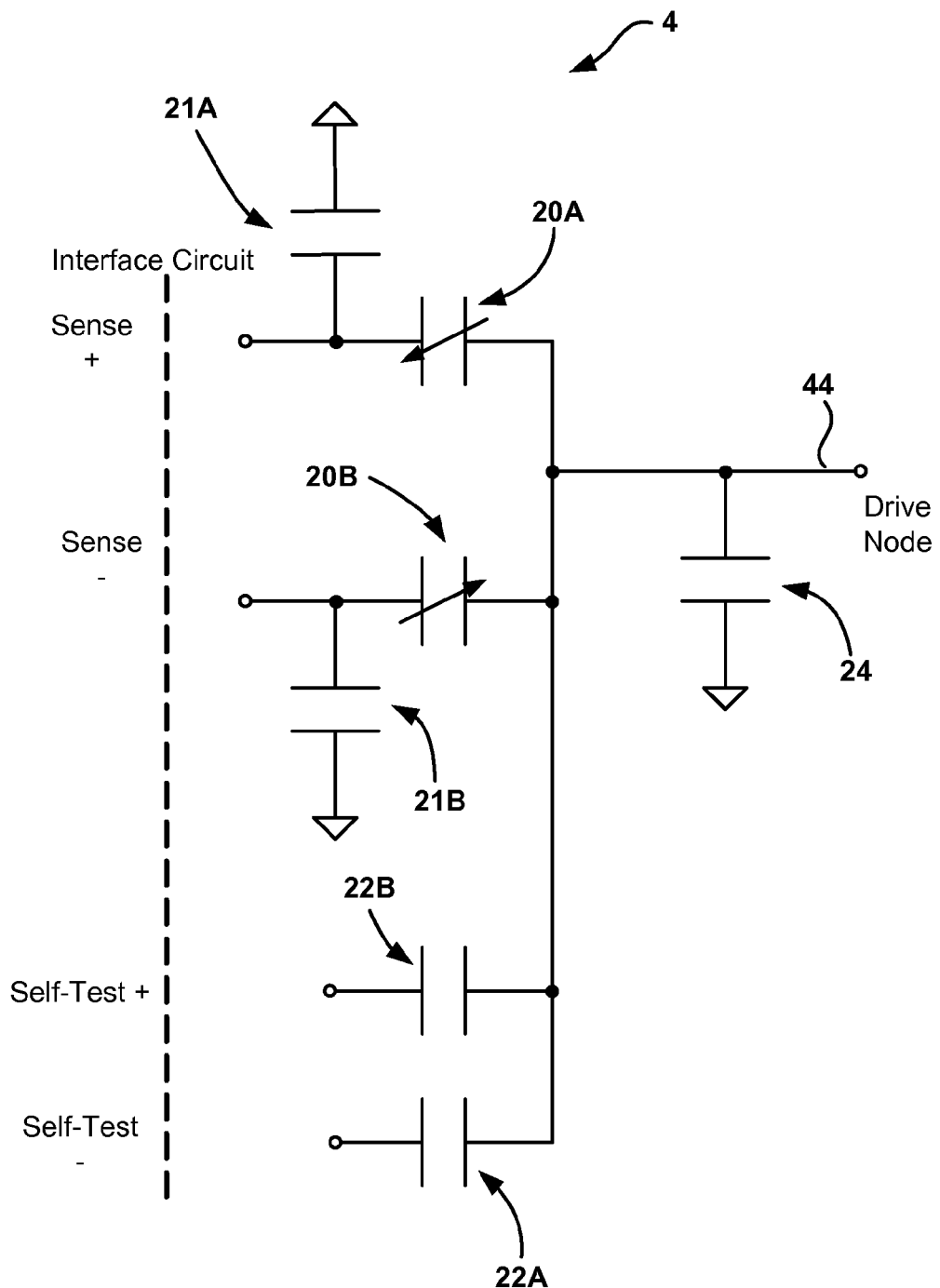
FIG. 3 is a circuit diagram illustrating an example model for a sensor in the sensor device of FIG. 1.

FIG. 3 is a circuit diagram illustrating sensor 4 of FIG. 1 modeled as an equivalent set of capacitors for purposes of illustration. The model of FIG. 3 represents a single axis of a multiple axis MEMS accelerometer. In FIG. 3, sensor 4 includes sense capacitors 20A and 20B (collectively referred to as "sense capacitors 20"), parasitic capacitors 21A and 21B (collectively referred to as "parasitic capacitors 21"), self test capacitors 22A and 22B (collectively referred to as "self-test capacitors 22"), and drive capacitor 24. Sense capacitors 20 represent the variable capacitances of an accelerometer, which may be formed by interdigitated fingers that act as capacitor plates.

A voltage is applied to sensor 4 through drive node 44, which is common among the three sensor axes. Drive node 44 may be generated by sensor interface 4. Thus, drive capacitor 24 represents the drive capacitance shared among the three sensors for a multiple axis MEMS accelerometer. Each of sense capacitors 20 is coupled to drive node 44 on one side and shunted to ground on the other side through corresponding parasitic capacitors 21. Sense capacitors 20 are read out differentially by an interface circuit, such as one of interface circuits 12 in FIG. 2. As an example, sense capacitances may be approximately 1 fF/G differential with a nominal sense capacitance of approximately 330 fF. The capacitance of parasitic capacitors 21 may be approximately 1.4 pF.

In general, self-test capacitors 22 are coupled at one end to drive node 44 and used to determine operability of sensor 4. At the other end, self-test capacitors may be coupled to an interface circuit, e.g., via special pins on the interface circuit. When a potential is applied to self-test capacitors 22 during a self-test, the voltage on self-test capacitors 22 is measured. If the measured voltage is within a pre-determined range, the operability of sensor 4 is verified. If the measured voltage is not within the pre-determined range, sensor 4 is considered inoperable. A self-test may be performed during the manufacturing process to verify that the sensor is operable before shipping to a vendor. A self-test may also be performed when the sensor is implanted within a patient.

Typical values for various parameters are summarized in Table 1 below. Table 1 also provides key variations or spread for the sense capacitances. These numbers may be used as the basis for the design of an exemplary capacitive interface circuit as described in this disclosure. Note that the capture voltage for sensor 4, where electrostatic attraction collapses the moving sensor fingers into the fixed fingers, is in excess of 5V. This means that the supply voltage can be safely doubled for driving sensor 4 to improve noise performance. In Table 1, Co (all axes) indicates total output capacitance for all capacitors, Csense(x,y) indicates the values of sense capacitors 20 for the x and y axes, Csense(z) indicates the value of sense capacitor 20 for the z axis, Csense_par(x,y) indicates the values of sense capacitor parasitic capacitance 21 for the x and y axes, Csense_par(z) indicates the value of sense capacitor parasitic capacitance 21 for the z axis, and Cdrive_par (all axes shared) indicates the combined drive capacitance 24 for all axes. Cdrive_par is associated with a common node that is driven and passed to the common rotor (MEMS beam) on the sensor so that the parasitic capacitance on that node is common to the three axes.

TABLE 1

| Capacitance | Nominal | Spread |
| --- | --- | --- |
| Co (all axes) | 0.3 pF | — |
| Csense (x, y) | 0.5 fF/g per sense cap | +/−15% |
| Csense (z) | 0.5 fF/g per sense cap | −35%/+85% |

TABLE 1-continued

| Capacitance | Nominal | Spread |
| --- | --- | --- |
| Csense_par (x, y) | 1 pF | — |
| Csense_par (z) | 1.7 pF | — |
| Cdrive_par (all axes shared) | 6 pF | — |
| Capture Voltage | 5.5 V (x, y); 7 V (z) | — |

In FIG. 3, inputs to sensor interface 6 are shown by the Sense+, Sense−, Self-Test+ and Self-Test− nodes. In particular, such inputs may be coupled to one of interface circuits 12, each of which may correspond to one of the X, Y and Z sensing axes. A differential amplifier forming part of a CTS circuit in an interface circuit 12 of sensor interface 6 receives the outputs of sense capacitors 20A, 20B via the Sense+ and Sense− nodes, respectively.

FIG. 4 is a circuit diagram illustrating an interface circuit 12A representing an example implementation of an interface circuit 12 of FIG. 2. One or more interface circuits 12A may be provided in sensor interface 6. For three-axis accelerometry, sensor interface 6 may include three different interface circuits 12A, e.g., one for each of the X, Y and Z axes. Interface circuit 12A transduces small capacitive deflections across differential capacitors 20A and 20B in sensor 4 into a stable, low noise analog output signal while operating with low power and a low clock rate.

In the example of FIG. 4, interface circuit 12A includes a correlated triple sampler 14 and a ping pong demodulator 16. Correlated triple sampler 14 and ping pong demodulator 16. FIG. 4 illustrates an interface circuit that may be used to transduce capacitive deflections along one axis of a multiple axis accelerometer into an analog signal that represents a measurement of acceleration along that axis. Ping pong demodulator 16 includes interleaved output stages 54A and 54B. In FIG. 4, output stage 54A is shown in detail while output stage 54B is represented as a block. The details of output stage 54B are omitted for ease of illustration, but identically conform to those of output stage 54A. A more detailed circuit diagram of a ping pong demodulator illustrating both output stages is provided in FIG. 7.

In FIG. 4, sensor 4 is represented with sense capacitors 20A and 20B. Sense capacitors 20A and 20B are coupled to a switch 33 at one end and to correlated triple sampler 14 at the other end. Switch 33 is controlled by timing signal Φ2. In general, sense capacitors 20A and 20B represent the change in capacitance of a capacitive based sensor, such as an accelerometer, gyroscope, pressure sensor, humidity sensor, and the like. Again, using an accelerometer as an example, sense capacitors 20A and 20B may represent the interdigitated fingers of an accelerometer that can move in a particular direction to change the overlapping area of the fingers or the spacing between the fingers.

Correlated triple sampler 14 includes a differential amplifier 15, a resistor 35, a sampling capacitor 34, and switches 36A and 36B. Switches 36A and 36B are coupled to positive input 38A and negative input 38B of differential amplifier 15, respectively, and are controlled by timing signal Φ1'. Switches 36A and 36B may be collectively referred to as "reset switches 36." Sampling capacitor 34 is coupled to the output of differential amplifier 15 through resistor 35. At the opposite end, sampling capacitor 34 is coupled to a reference potential, i.e., Vref/2, through a switch 42 controlled by the timing signal Φ1.

Figure 8:
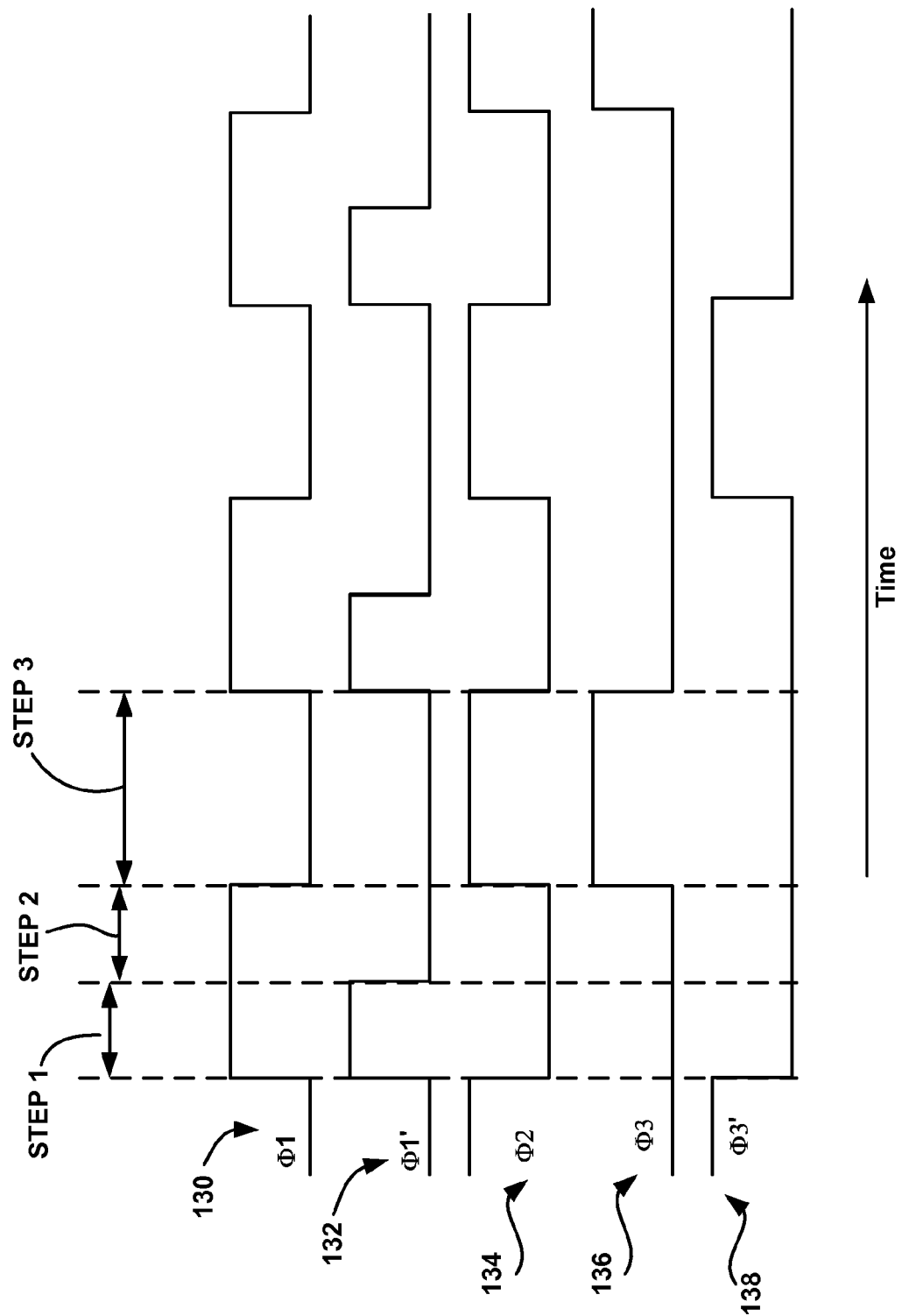
FIG. 8 illustrates timing waveforms for the interface circuits of any of FIGS. 4-6.

As previously described, correlated triple sampler 14 uses a CTS process to translate a sensor signal received from sensor 4 into a low noise signal by substantially eliminating kT/C noise, as well as amplifier offset and flicker noise, from the signal. The three steps of the CTS process are driven by timing signals Φ1', Φ1, and Φ2, which are provided by clock distribution network 18. Clock distribution network 18 may produce timing signals Φ1', Φ1, and Φ2 from a single clock signal. In particular, timing signal may be produced such that Φ1' is high during a first portion of a first phase of the clock signal and low during a second portion of the first phase and during a second phase of the clock signal, Φ1 is high during the entire first phase of the clock signal and low during the entire second phase of the clock signal, and Φ2 is high during the second phase of the clock signal and low during the first phase. An example of the relative timing of the clock signals are illustrated in FIG. 8.

The switches in FIG. 4, i.e., switches 33, 36A, 36B, 42, 43, 50A, and 50B, close when the corresponding timing signal is high and open when the signal is low. Initially, timing signals Φ1' and Φ1 are high and Φ2 is low. This corresponds to the first step of the CTS process, i.e., the reset step. During the reset step, switch 33 is open and sense capacitors 20A and 20B are connected to a system ground through reset switches 36A and 36B, respectively. Consequently, kT/C noise builds up on sense capacitors 20A and 20B. At the same time, sampling capacitor 34 is coupled to a reference voltage, Vref/2, through switch 42.

The second step of the CTS process is characterized by an interval when Φ1 is high and Φ1' and Φ2 are low, i.e., an interval initiated when Φ1' falls and Φ1 remains high. This state corresponds to a second portion of the first phase of the clock signal provided to clock distribution network 18. When only Φ1 is high, reset switches 36A and 36B open and sense capacitors 20A and 20B are coupled to inputs 38A and 38B of differential amplifier 15, respectively. Accordingly, sensor 4 is read out differentially by amplifier 15 via sense capacitors 20A and 20B to reject electromagnetic interference and leakage currents as common-mode phenomena. The amplified signal produced by differential amplifier 15 is stored on sampling capacitor 34 via series resistor 35. The amplified signal is a noise signal that includes kT/C noise as well as offset and flicker noise associated with amplifier 15.

The third step is characterized by the fall of Φ1 and the rise of Φ2. The interval of the third step corresponds to the second phase of the clock signal supplied to the clock distribution network 18. Switches 33 and 43 close in response to the rise of Φ2. As a result, common node 44 that couples sense capacitors 20A and 20B is driven to a reference potential, Vref, while sampling capacitor 34 is coupled to ping pong demodulator 16. Any imbalance in sense capacitors 20A and 20B is amplified by differential amplifier 15 and the voltage step is transferred to the output. Reference and bias voltage generator 19 may supply the reference voltage to common node 44.

In this way, the amplified signal produced by differential amplifier 15 includes an amplified representation of the sensor signal and a noise component that includes kT/C noise associated with sense capacitors 20A and 20B and amplifier offset and flicker noise associated with amplifier 15. This output of amplifier 15 is subtracted by the signal held on sampling capacitor 34 thereby substantially eliminating the kT/C noise, amplifier offset, and flicker noise.

Although the kT/C noise as well as the flicker noise and offset are substantially removed, ping pong demodulator 16 provides additional processing to reduce glitching caused by clock transients and aliased white noise. Ping pong demodulator 16 includes interleaved output stages 54A and 54B and selector 56. Selector 56 toggles the output of correlated triple sampler 14 between output stages 54A and 54B under the control of timing signal Φ3. In particular, selector 56 applies the output of correlated triple sampler 14 to output stage 54A when Φ3 is high and applies the output to output stage 54B when the Φ3 is low. The polarity of timing signal Φ3 alternates with each cycle of the master clock tied to signals Φ1, Φ1', and Φ2. In this way, the output of correlated triple sampler 14 is applied to output stage 54A during a first clock cycle while output stage 54B outputs a signal to additional processing circuitry at the same time. The signal output by stage 54B is based on the signal applied to stage 54B during a second clock cycle previous to the first clock cycle. During a third clock cycle following the first clock cycle, the output of correlated triple sampler 14 is applied to output stage 54B while output stage 54A outputs a signal based on the signal sampled during the first clock cycle.

The following describes the operation of output stage 54A in detail with respect to the components illustrated in FIG. 4. More specifically, the following describes operation when Φ3 is high and the output of correlated triple sampler 14 is applied to output stage 54A. Output stage 54A includes amplifier 17, hold capacitor 48, and feedback capacitor 46 in FIG. 4. Amplifier 17 and hold capacitor 48 form an integrator while feedback capacitor 46 provides negative feedback to the output of correlated triple sampler 14. The voltage stored on feedback capacitor 46 is controlled by switches 50A and 50B. In particular, when Φ1 is high and Φ2 is low, switch 50A couples feedback capacitor 46 to Vref/2 in FIG. 4. Consequently, sampling capacitor 34 holds Vref when Φ1 is high. However, when Φ2 is high and Φ1 is low, switch 50B couples feedback capacitor 46 to the output of amplifier 17.

During the first two steps of the CTS process, i.e., when Φ1 is high, ping pong demodulator 16 (selector 56) is not connected to the output of correlated triple sampler 14. However, when Φ2 is high, switch 43 is closed and the output of correlated triple sampler 14 is connected to ping pong demodulator 16 (selector 56). Because Φ3 is high in the context of this description, selector 56 applies the output of correlated triple sampler 14 to the noninverting input of amplifier 17. At the same time, switch 42 is open and the inverting input of amplifier 17 is coupled to a reference voltage, Vref/2. Accordingly, amplifier 17 and hold capacitor 48 begin to operate as an integrator. The signal produced by the integrator, however, is not presented at the output (Vout) for processing by additional circuitry, e.g., circuitry located off of sensor interface 6 when Φ2 is high. This is because switch 52, which is controlled by Φ3', is low when Φ3 is high. Consequently, the integrator holds the sampled signal until switch 52 closes during the following clock cycle. The purpose of holding the signal until the following clock cycle is to reduce clock transients referred to the output caused by the long transients in the signal path. In particular, ping pong demodulator 16 presents the previously sampled state to the output after the signal at the output node has had time to settle.

Switch 52 closes when timing signal Φ3 falls, which occurs during the following clock cycle. During this following clock cycle, correlated triple sampler 14 operates in the same manner as it did during the previous clock cycle. That is, correlated triple sampler 14 produces a low noise signal in accordance with the CTS process. Selector 56, however, applies the low noise signal to output stage 54B instead of output stage 54A during the third step (sampling step). During this sampling step, switch 52 closes and output stage 54A presents the signal it held during the previous clock cycle to the output (Vout). At the same time, output stage 54B samples the output of correlated triple sampler 14 using an integrator similar to the integrator in output stage 54A. The sampled signal is held until the next clock cycle when the process repeats and the low noise signal produced by correlated triple sampler 14' is sampled by output stage 54A.

For a particular implementation of a multiple axis accelerometer that utilizes interface circuit 12A for each axis, the net charge redistribution may yield approximately 1.8 mV/G differentially on both the x and y axis channels, and 1.2 mV/G on the z-axis channel, assuming the on-chip bond pads and interface routing is bootstrapped to reduce parasitic loads. The common-mode step may be approximately 500 mV. Differential amplifier 15 rejects the common-mode shift of sensor 4, while amplifying the small differential voltage by a gain of $A_{ina}$=50 (x-y) and 75 (z). This shift in the voltage passes charge through sampling capacitor 34, which is countered by the feedback charge from feedback capacitor 46. Because switches 50A and 50B are responsive to Φ1 and Φ2, respectively, and couple feedback capacitor 46 to Vref/2 and the output of amplifier 17, respectively, the total signal chain gain A between the input of amplifier 15 and the output of amplifier 17 is therefore:

$$A = 2*V\text{ref}*[(dC/G)/(C\text{tot})]*A_{ina}*Cs/Cfb,$$

where A is the gain, Vref is the reference voltage, dC/G is the change in capacitance per G of acceleration, Ctot is the total capacitance of the sensor, Aina is the gain of differential amplifier 15, Cs is the capacitance of sampling capacitor 34, and Cfb is the capacitance of feedback capacitor 44. For a ratio of sense capacitor 34 to feedback capacitor 46 (Cs/Cfb) of 1.1, this may yield a net transduction ratio of approximately 100 mV/G at the output of the signal chain.

In the circuit of FIG. 4, capacitive interface circuit 14 includes differential amplifier 15, sampling capacitor 34, and a correlated triple sampling circuit that reduces one or more noise components in the output signal. In the example of FIG. 4, the correlated triple sampling circuit is formed by switches 42, 43, 36A, 36B, and 33, which operate according to different clock phases to implement the correlated triple sampling process with respect to the signal received by sampling capacitor 34. As discussed above, the correlated tripling sampling circuit couples an output of sampling capacitor 34 during a first clock phase Φ1, couples the first and second inputs of differential amplifier 15 to ground during a first (reset) portion Φ1' of the first clock phase, decouples the first and second inputs of differential amplifier 15 from ground during a second portion of the first clock phase Φ1, decouples the output of the sampling capacitor 34 from ground during a second clock phase Φ2, couples the first and second capacitive sensor elements 20A, 20B to a reference voltage during the second clock phase Φ2, and decouples the first and second capacitive sensor elements 20A, 20B from the reference voltage during the first clock phase Φ1.

In this manner, sampling capacitor 34 receives one or more noise components during both the second portion of the first clock phase Φ1 and the second clock phase Φ2, and blocks at least a portion of the one of more noise components during the second clock phase Φ2 to reduce the one or more noise components in the output signal. In particular, because the noise components do not change between the first and second clock phases, capacitor 34 does not pass them to selector 56 via switch 43. Instead, the unchanging noise components are filtered out of the output signal by the correlated triple sampling process. In this way, circuit 14 can reduce kT/C noise, amplifier offset, and flicker noise in the output signal applied to ping-pong demodulator 16. The correlated triple sampling circuit controls inputs to the differential amplifier 15 such that the differential amplifier amplifies the one or more noise components in at least a portion of the first clock phase Φ1, and amplifies the sensor signal with the one or more noise components during the second clock phase Φ2.

In the example of FIG. 4, the correlated triple sampling circuit 14 comprises a first switch 42 that couples an output of sampling capacitor 34 to ground during the first clock phase Φ1 and decouples the output of the sampling capacitor from ground during the second clock phase Φ2, a second switch 36A that couples the first input of the amplifier 15 to ground during the first portion Φ1' of the first clock phase Φ1 and decouples the first input of the amplifier 15 from ground during a second portion of the first clock phase Φ1, a third switch 36B that couples the second input of the amplifier 15 to ground during the first portion Φ1' of the first clock phase Φ1 and decouples the second input of the amplifier from ground during a second portion of the first clock phase Φ1, and a fourth switch 33 that couples a reference voltage to the first and second capacitive sensor elements 20A, 20B during the second clock phase Φ2 and decouples the reference voltage from the first and second capacitive sensor elements during the first clock phase Φ1. A fifth switch 43 couples the output of capacitor 34 to selector 56.

FIG. 5 is a circuit diagram illustrating another example implementation of one of interface circuits 12 that is referred to in this disclosure as interface circuit 12B. Similar to interface circuit 12A, interface circuit 12B in FIG. 5 includes triple correlated sampler 14 and ping pong demodulator 16. Accordingly, interface circuit 12A and interface circuit 12B operate in a similar manner with respect to correlated triple sampler 14 and ping pong demodulator 16. However, the analog feedback to the output of correlated triple sampler 14 associated with interface circuit 12A is replaced with global analog feedback in interface circuit 12B.

In FIG. 5, interface circuit 12B interfaces with sensor 4, which includes sense capacitors 20A and 20B and excitation capacitors 64A and 64B (collectively referred to as "excitation capacitors 64"). Each of sense capacitors 20 has one of its capacitive plates tied to a system ground and the other plate coupled to a corresponding one of excitation capacitors 64. Holding one of the capacitive plates of sense capacitors 20 at a common potential is characteristic of pressure sensors. Thus, interface circuit 12B of FIG. 5 may be particularly useful for a MEMS sensor with pressure sensor architectures.

In the illustrated example of FIG. 5, the global feedback includes two feedback paths that provide differential global feedback to respective signal paths in sensor 4. The upper feedback path shown in FIG. 5 includes feedback capacitor 60A which is coupled at one end to a node shared with excitation capacitor 64A and sense capacitor 20A. At the other end, feedback capacitor 60A is coupled to ground or a reference potential via switch 61B and to the output of ping pong demodulator 16' via switch 61A. Switches 61B and 61A are controlled by timing signals Φ2 and Φ1, respectively.

Similarly, the lower feedback path in FIG. 5 includes feedback capacitor 60B. Feedback capacitor 60B is coupled at one end to a node shared with excitation capacitor 64B and sense capacitor 20B. At the other end, feedback capacitor 60B is coupled to ground or a reference potential via switch 63A and to the output of ping pong demodulator 16 via switch 63B. Switches 63A and 63B are controlled by timing signals Φ1 and Φ2, respectively. The phasing of switches 63A and 63B is set to provide differential feedback from a single-ended measurement.

In general, the global feedback provided by feedback capacitors 60 linearizes the output of interface circuit 12B (Vout). The net transfer function for interface circuit 12B is provided in Equation 1, where Vdr is the amplitude of Φ2 that excites capacitors 64, Ccm is the capacitance of capacitors 64, Cfb is the capacitance of feedback capacitors 60, Cs1 is the capacitor of sense capacitor 20A, and Cs2 is the capacitance of sense capacitor 20B.

$$Vout = Vdr(Ccm/Cfb)(Cs1-Cs2)[1+2((Ccm+Cfb)/(Cs1-Cs2))] \qquad (1)$$

The $[1+2((Ccm+Cfb)/(Cs1-Cs2))]$ component in Equation 1 is non-linear. This non-linear component may be small for applications such as posture, movement, and fall detection. Thus, the bandwidth of interface circuit 12B is set by the first-order integration path, i.e., the capacitance of hold capacitor 48 associated with output stage 54A and the corresponding hold capacitor associated with output stage 54B. In addition, the accuracy for interface circuit 12B is set by the ratio of excitation capacitors 64 and feedback capacitors 60 and the characteristics of sensor 4.

FIG. 6 is a circuit diagram illustrating yet another example implementation of interface circuits 12 that is referred to in this disclosure as interface circuit 12C. Similar to interface circuit 12B, interface circuit 12C is coupled to sensor 4 and includes triple correlated sampler 14. However, interface circuit 12C replaces ping pong demodulator 16 with ping pong demodulator 16B, which outputs a discrete signal that is applied to sensor 4 as differential global feedback.

In FIG. 6, correlated triple sampler 14 operates as previously described. That is, correlated triple sampler 14' outputs a low noise signal that is sampled from sensor 4'. Ping pong demodulator 16B and, more particularly, output stages 54 process the low noise signal as previously described to produce a stable, low noise signal that is received by quantizer 56. In FIG. 6, quantizer 56 is clocked with timing signal Φ1 and converts the analog output of output stages 54 into a digital bitstream of discrete pulses with amplitude Vref. The digital bitstream produced by quantizer 56, i.e., VoutDisc, on average, represents the analog signal produced by output stages 54. In this way, the integrators in output stages 54 and quantizer 56 operate similar to a sigma-delta converter. A digital signal processor or other equivalent circuitry quantizer 56 averages the digital bitstream to generate the output signal VoutDisc as the average of the discrete pulses.

The discrete output VoutDisc is applied as global feedback to sensor 4 through feedback capacitors 60. The global feedback is provided in a similar fashion as the analog global feedback in FIG. 5. Accordingly, the global feedback provided by feedback capacitors 60 linearizes the output of sensor 4 such that the net transfer function is provided in equation 2 below, where VoutDisc is the amplitude of the discrete global feedback that excites capacitors 64, Ccm is the capacitance of capacitors 64, Cfb is the capacitance of feedback capacitors 60, Cs1 is the capacitor of sense capacitor 20A, and Cs2 is the capacitance of sense capacitor 20B.

$$Vout = VoutDisc(Ccm/Cfb)(Cs1-Cs2)[1+2((Ccm+Cfb)/(Cs1-Cs2))] \qquad (2)$$

Similar to interface 12B in FIG. 5, the bandwidth of integrator circuit 12C is set by the first-order integration path and accuracy is set by the ratio of excitation capacitors 64 and feedback capacitors 60 and the characteristics of sensor 4.

Figure 7:
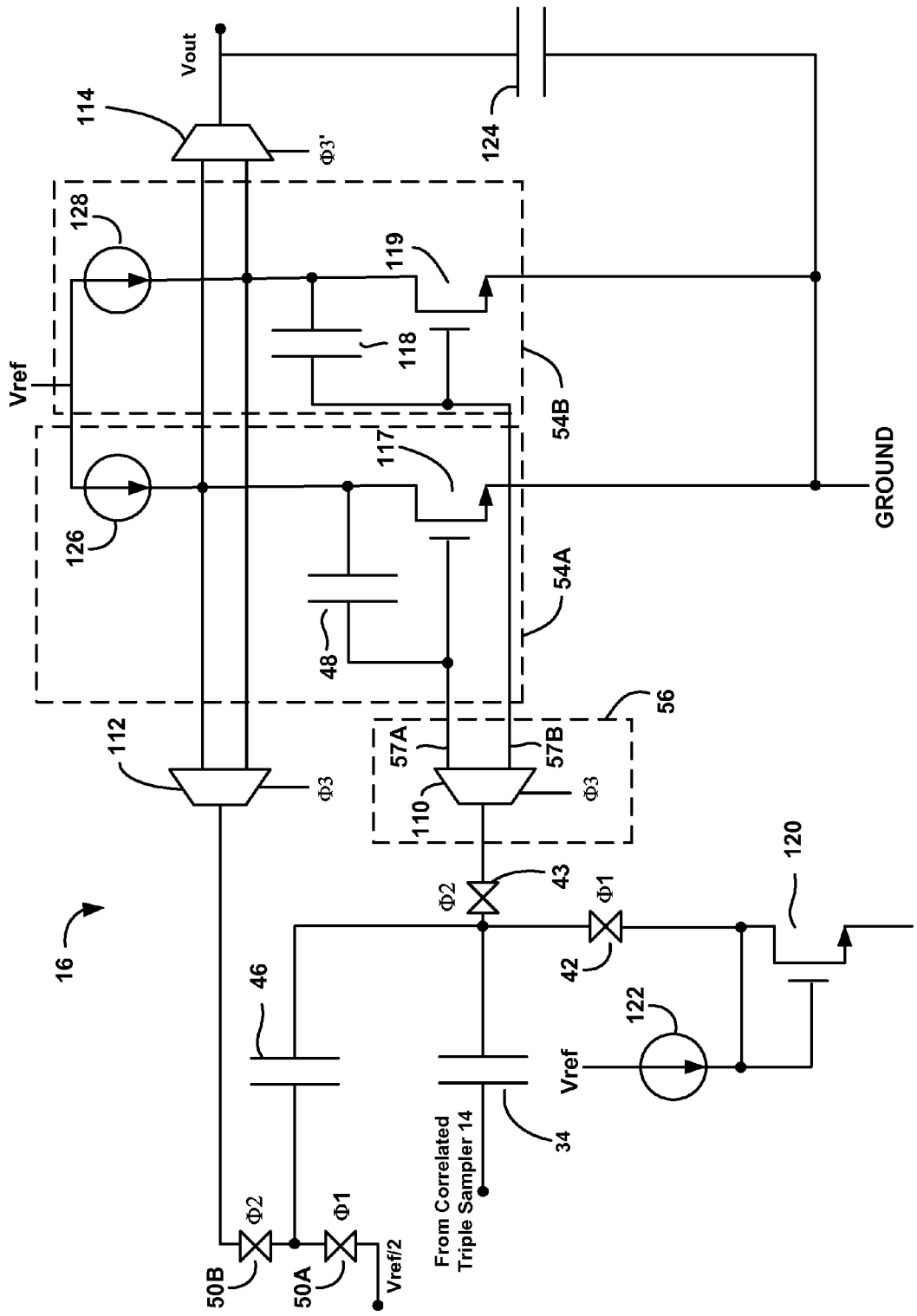
FIG. 7 is a circuit diagram illustrating a ping pong demodulator for use with any of the interface circuits of any of FIGS. 4-6.

FIG. 7 illustrates an example circuit diagram for ping-pong demodulator 16. In general, ping-pong demodulator 16 serves as both a demodulator and as an output sample-and-hold buffer. As previously described, ping pong demodulator 16 includes two interleaved output stages, i.e., output stages 54A and 54B in FIGS. 4-6. While one of the stages (ping stage) samples the output from correlated triple sampler 14 and holds the sampled data until the next clock cycle, the other stage (pong stage) presents the previously sampled output of correlated triple sampler 14 to the output. The pong stage presents the signal sampled during the previous clock cycle to the output after the signal has settled. In this manner, ping pong demodulator 16 substantially reduces clock transients in the output.

In FIG. 7, ping pong demodulator 16 is illustrated in greater detail. That is, example components that may be used to realize output stages 54A, 54B are shown. With respect to FIG. 7, the output from correlated triple sampler 14 is applied to one side of sampling capacitor 34 while the other side of sampling capacitor is toggled between a reference voltage and the input of selector 56 by switches 42 and 43, respectively. The reference voltage may be equivalent to Vref/2 as previously described and is provided in FIG. 7 by current source 122 and transistor 120. The phasing of timing signals Φ1 and Φ2 removes kT/C noise, amplifier offset, and flicker noise from the signal sampled onto sampling capacitor 34 during Φ2.

When Φ2 is high, switch 43 closes and applies the low noise signal held on sampling capacitor 34 to selector 56. As shown in FIG. 7, selector 56 may be a multiplexer 110 that applies the signal at its input to one of output nodes 57 under the control of timing signal I. For example, when I is high, multiplexer 110 may apply the low noise signal at its input to output node 57A which is coupled to output stage 54A. When I is low, however, multiplexer 110 applies the low noise signal at its output to output node 57B, which is coupled to output stage 54B. The phasing of timing signal I causes multiplexer 110 to alternately apply the low noise signal held on sampling capacitor 34 to output stages 54A and 54B for each clock cycle of the master clock signal.

Each of output stages 54 includes a sample-and-hold (S/H) circuit. In FIG. 7, the S/H circuit of output stage 54A includes transistor 117 and hold capacitor 48 and the S/H circuit of output stage 54B includes transistor 119 and hold capacitor 118. This configuration allows for rail-to-rail swing on the output. Transistors 117 and 119 and hold capacitors 48 and 118 should be well matched. The gate and source of transistor 117 are coupled to output node 57A and current source 126, respectively. Similarly, the gate and source of transistor 119 are coupled to output node 57B and current source 128. The drain of transistors 117 and 119 is coupled to one side of output capacitor 124. The other side of capacitor 124 is coupled to the output of ping pong demodulator 16'.

The signals produced by output stages 54A, 54B are coupled to multiplexers 112 and 114, respectively, which are controlled by timing signals Φ3 and Φ3', respectively. Multiplexers 112 and 114 selectively apply one of the signals at its input to its output. When Φ3 is high and Φ3' is low, for example, multiplexer 110 may apply the signal on sampling capacitor 34 to output stage 54A. Accordingly, transistor 117 and hold capacitor 48 in output stage 54A operate as an integrator to hold this signal. At the same time, multiplexer 112 applies the signal produced by output stage 54B as feedback through feedback capacitor 46. Also, at the same time, multiplexer 114 applies the signal produced by output stage 54B to the output of ping pong demodulator 16 as Vout. As previously described, the signal produced by output stage 54B at this time is based on the signal sampled onto sampling capacitor 34 during the previous clock cycle. When the signal was sampled during the previous clock cycle, the signal included transients (glitches) due to fast dynamics in the signal path. When this signal is applied to the output of ping pong demodulator 16 by multiplexer 114 in the following clock cycle, the transients have settled, thereby producing a stable, low noise signal at the output of ping pong demodulator 16. When Φ3 is low and Φ3' is high, output stage 54A becomes active. In particular, multiplexer 110 applies the output of capacitor 34 to output stage 54B, multiplexer 112 applies the signal produced by output stage 54A as a feedback signal, and multiplexer 114 applies the signal produced by output stage 54A to the output of ping-pong demodulator 16 as Vout.

FIG. 8 illustrates timing signals or waveforms for the interface circuit. Timing waveforms, Φ1 130, Φ1' 132, and Φ2 134, drive the three-step CTS process for removing kT/C noise from the signal chain. Timing waveforms Φ3 136 and Φ3' 138 control operation of ping pong demodulator 16. The phasing of timing waveforms Φ1 130, Φ1' 132, and Φ2 134, Φ3 136, and Φ3' 138 is important for proper operation of the interface circuit described in this disclosure. However, the exact timing shown in FIG. 8 is presented for purposes of illustration and should not be considered limiting.

FIG. 8 shows that timing waveform Φ1' 132 and timing waveform 130 rise at the same time, but the interval of time that Φ1' 132 is high is shorter than the interval of time during which Φ1 130 is high. In addition, FIG. 8 shows that timing waveform Φ1 130 falls at the same time that Φ2 134 rises.

With respect to timing waveforms Φ3 136 and Φ3' 138, FIG. 8 shows that these waveforms each have a period that is twice the size of the period of timing waveform Φ2 134. In particular, the interval during which timing waveforms Φ3 136 and Φ3' 138 are high coincide with intervals during which timing waveform Φ2 is high. However, the intervals during which timing waveforms Φ3 136 and Φ3' 138 are high coincide with every other interval for timing waveform Φ2 134.

FIG. 9 illustrates an example circuit diagram for differential amplifier 15 in correlated triple sampler 14. In general, differential amplifier 15 may be a low-power instrumentation amplifier with stable gain characteristics, good linearity, e.g., less than 2% integrated non-linearity (INL) +/−20 mV, and wide common-mode range. In the example of FIG. 9, differential amplifier 15 includes field effect transistors (FETs) 140A, 140B, 142A, 142B, 160, 161, 162, 163, 164 and 165, constant current sources 152, 154, 156, and 158, resistor 144, and resistors 150A and 150B coupled at output node 146. The gates of FETS 140A, 140B receive bias voltages Vb. Current sources 152, 154 generate bias currents Ib1, and current sources 156, 158 generate bias currents Ibo. The gates of FETs 140A, 140B receive the differential input signal from the sensor, e.g., from variable capacitors 20A, 20B. Resistor 144 is coupled across the sources of FETs 140A, 140B and across the drains of FETs 160, 161. Current through front-end field effect transistors (FETs) 142A and 142B is held constant by a mirror servo loop. The mirror servo loop forces the differential voltage received at the gates of input FETs 140A and 140B to fall across source resistor 144. Top-side currents, i.e., currents generated by current sources 152 and 154, are mirrored to an output resistor tap 146 via FETs 162, 163, 164, 165. In particular, the gate of FET 162 is coupled to current source 154 and the gate of FET 163 is coupled to the gate of FET 160. Differential amplifier 15 has a gain that is set by the resistor ratio Ro/Ri, where Ro is the resistance of each of resistors 150A and 150B and Ri is the resistance of source resistor 144. This gain may be stable across process corners. Additionally, by supplying a reference (Vref) to the top of the resistor string, i.e., resistor 150A, an arbitrary bias point for the output, Vout_sense, can be set. For example, a reference voltage of 1.2V may yield a sensor centered at 0.6V. Other features of differential amplifier 15 may include improved linearity over the dynamic range of the sensor, e.g., +/−20 mV, a wide common-mode range such as 0 V to approximately 1.2V, and an inherent ability to bootstrap pads and other critical signal lines through a low-impedance source, which servo tracks the gate voltage.

A sensor device as described in this disclosure, as well as associated circuitry, devices, systems and methods, may be useful in a variety of applications, For example, the invention may be applied to support sensing relating to electrical stimulation or drug delivery therapies for a variety of symptoms or conditions such as cardiac arrhythmia, cardiac fibrillation, chronic pain, tremor, Parkinson's disease, epilepsy, urinary or fecal incontinence, sexual dysfunction, obesity, or gastroparesis, and may apply to electrical stimulation or drug delivery to a variety of tissue sites, such as the heart, brain, spinal cord, pelvic nerves, peripheral nerves, or the gastrointestinal tract of a patient.

Sensor device 2 may be integrated with, housed in, coupled to, or otherwise associated with an external or implantable medical device, such as a cardioverter/defibrillator, spinal cord stimulator, pelvic nerve stimulator, deep brain stimulator, gastrointestinal stimulator, peripheral nerve stimulator, or muscle stimulator. Sensor device 2 also may be used in conjunction with implantable or external drug delivery devices. For example, sensor device 2 may reside within an implantable medical device housing or a lead or catheter coupled to such a device. Sensor device 2 may be used in conjunction with different therapeutic applications, such as cardiac stimulation, deep brain stimulation (DBS), spinal cord stimulation (SCS), pelvic stimulation for pelvic pain, incontinence, or sexual dysfunction, gastric stimulation for gastroparesis, obesity or other disorders, or peripheral nerve stimulation for pain management. Stimulation also may be used for muscle stimulation, e.g., functional electrical stimulation (FES) to promote muscle movement or prevent atrophy.

The illustrated components of sensor device 2 and sensor interface 6 may be realized by any of a variety of different fabrication techniques, including various IC process technologies such as complementary metal oxide semiconductor (CMOS), bipolar junction transistor (BJT), bipolar-CMOS (BiCMOS), silicon germanium (SiGe), gallium arsenide (GaAs), and the like. In addition, operation of sensor device 2 may be implemented in part or aided by additional components or functionality realized by one or more DSPs, microprocessors, application specific integrated circuits (ASICs), field programmable gate array (FPGAs), or any other equivalent integrated or discrete circuitry, as well as any combination of such components.

Various aspects of the disclosure have been described. The foregoing description has been presented for the purposes of illustration, and is not intended to be exhaustive or limiting. Many modifications and variations are possible within the scope of the following claims.

The invention claimed is:

1. An implantable medical device, comprising:
a correlated sampling circuit that reduces one or more noise components in an output signal, the correlated sampling circuit comprising:
  a differential amplifier that amplifies a sensor signal to produce the output signal, wherein the differential amplifier comprises a first input, a second input, and an output; and
  a sampling capacitor comprising an input coupled to the output of the differential amplifier, wherein the sampling capacitor stores the output signal; and
a clock distribution network that controls the correlated sampling circuit,
wherein the correlated sampling circuit controls the first and second inputs of the differential amplifier, responsive to timing signals provided by the clock distribution network, such that the differential amplifier amplifies the one or more noise components during at least a portion of a first clock phase and amplifies the sensor signal with the one or more noise components during a second clock phase, to reduce the one or more noise components in the output signal.

2. The device of claim 1, wherein the first input of the differential amplifier is coupled to a first capacitive sensor element, and wherein the second input of the differential amplifier is coupled to a second capacitive sensor element.

3. The device of claim 1, wherein the correlated sampling circuit couples an output of the sampling capacitor to ground during the first clock phase, couples the first and second inputs to ground during a first portion of the first clock phase, decouples the first and second inputs from ground during a second portion of the first clock phase, decouples the output of the sampling capacitor from ground during the second clock phase, couples the first and second capacitive sensor elements to a reference voltage during the second clock phase, and decouples the first and second capacitive sensor elements from the reference voltage during the first clock phase.

4. The device of claim 3, wherein the sampling capacitor receives the one or more amplified noise components during both the first clock phase and the second clock phase, and substantially reduces or eliminates at least the portion of the one of more amplified noise components during the second clock phase to reduce the one or more amplified noise components in the output signal.

5. The device of claim 1, wherein:
the first input of the differential amplifier is coupled to a first capacitive sensor element and the second input of the differential amplifier is coupled to a second capacitive sensor element; and
wherein the correlated sampling circuit further comprises:
  a first switch that couples an output of the sampling capacitor to ground during the first clock phase and decouples the output of the sampling capacitor from ground during the second clock phase;
  a second switch that couples the first input of the differential amplifier to ground during a first portion of the first clock phase and decouples the first input of the differential amplifier from ground during a second portion of the first clock phase;
  a third switch that couples the second input of the differential amplifier to ground during the first portion of the first clock phase and decouples the second input of the differential amplifier from ground during a second portion of the first clock phase; and
  a fourth switch that couples a reference voltage to the first and second capacitive sensor elements during the second clock phase and decouples the reference voltage from the first and second capacitive sensor elements during the first clock phase.

6. The device of claim 1, wherein the sampling capacitor stores the one or more amplified noise components from the differential amplifier in at least the portion of the first clock phase, receives the amplified sensor signal with the one or more amplified noise components from the differential amplifier during the second clock phase, and blocks the one or more amplified noise components to reduce the one or more amplified noise components in the output signal.

7. The device of claim 1, wherein the differential amplifier receives the sensor signal from first and second capacitive sensor elements, and wherein each of the first and second capacitive sensor elements has a first capacitor plate coupled to an input of the differential amplifier and a second capacitor plate coupled to a reference voltage.

8. The device of claim 1, wherein the differential amplifier receives the sensor signal from first and second capacitive sensor elements, and wherein each of the first and second capacitive sensor elements has a first capacitor plate coupled to an input of the differential amplifier and a second capacitor plate coupled to ground.

9. The device of claim 1, further comprising:
a ping-pong demodulator that samples and holds an output of the correlated sampling circuit in first and second output stages on an alternating basis.

10. The device of claim 9, wherein each of the output stages holds the output of the correlated sampling circuit for an amount of time sufficient to permit settling of at least some undesirable transients.

11. The device of claim 9, wherein the first output stage comprises an amplifier and a hold capacitor.

12. The device of claim 11, wherein the amplifier and the holdback capacitor form an integrator.

13. The device of claim 9, further comprising a feedback path between an output of the ping-pong demodulator and an input to the ping-pong demodulator.

14. The device of claim 9, wherein the feedback path comprises:
at least one feedback capacitor that provides negative feedback to the output of the correlated sampling circuit.

15. The device of claim 14, wherein the feedback path further comprises:
at least one switch configured to control a voltage stored on the feedback capacitor.

16. The device of claim 15, wherein the at least one switch is configured to alternate between coupling the feedback capacitor to a reference voltage and an output of the ping-pong demodulator.

17. The device of claim 16, wherein the at least one switch comprises a first switch and a second switch, and wherein the first switch is configured to couple the feedback capacitor to the reference voltage during at least a portion of the first clock phase, and couple the feedback capacitor to the output of the ping-pong demodulator during at least a portion of the second clock phase.

18. The device of claim 9, further comprising:
a first differential feedback path coupled between the output of the ping-pong demodulator and the first input of the differential amplifier, and a second differential feedback path coupled between the output of the ping-pong demodulator and the second input the differential amplifier.

19. The device of claim 18, wherein the first input of the differential amplifier is coupled to a first capacitive sensor element of a pressure sensor, and wherein the second input of the differential amplifier is coupled to a second capacitive sensor element of a pressure sensor.

20. The device of claim 19, wherein the first feedback path comprises a first feedback capacitor, and wherein the second feedback path comprises a second feedback capacitor.

21. The device of claim 20, wherein the first feedback capacitor comprises a first end coupled to the first input of the differential amplifier, and wherein the second feedback capacitor comprises a second end coupled to the second input of the differential amplifier.

22. The device of claim 21, wherein the first feedback capacitor comprises a second end coupled to a first at least one switch, and wherein the second feedback capacitor comprises a second end coupled to a second at least one switch.

23. The device of claim 22, wherein the first at least one switch comprises a first switch configured to couple the first feedback capacitor to the output of the ping-pong demodulator, and a second switch configured to couple the first feedback capacitor to ground or a reference voltage.

24. The device of claim 23, wherein the second at least one switch comprises a first switch configured to couple the second feedback capacitor to the output of the ping-pong demodulator, and a second switch configured to couple the second feedback capacitor to ground or a reference voltage.

25. A method for operating an implantable medical device, comprising:
amplifying, via a differential amplifier, a differential sensor signal to produce an output signal, wherein the differential amplifier comprises a first input, a second input, and an output;
storing the output signal on a sampling capacitor comprising an input coupled to the output of the differential amplifier; and
applying a correlated sampling process to reduce one or more noise components in the output signal, wherein applying the correlated sampling process includes controlling the first and second inputs of the differential amplifier, responsive to timing signals provided by a clock distribution network, such that the differential amplifier amplifies the one or more noise components during at least a portion of a first clock phase and amplifies the differential sensor signal with the one or more noise components during a second clock phase, to reduce the one or more noise components in the output signal.

26. The method of claim 25, wherein the first input of the differential amplifier is coupled to a first capacitive sensor element, and wherein the second input of the differential amplifier is coupled to a second capacitive sensor element.

27. The method of claim 25, wherein the correlated sampling process comprises coupling an output of the sampling capacitor during the first clock phase, coupling the first and second inputs to ground during a first portion of the first clock phase, decoupling the first and second inputs from ground during a second portion of the first clock phase, decoupling the output of the sampling capacitor from ground during the second clock phase, coupling the first and second capacitive sensor elements to a reference voltage during the second clock phase, and decoupling the first and second capacitive sensor elements from the reference voltage during the first clock phase.

28. The method of claim 27, further comprising receiving the one or more amplified noise components at the sampling capacitor during both the second portion of the first clock phase and the second clock phase, and substantially reducing or eliminating at least the portion of the one of more amplified noise components via the sampling capacitor during the second clock phase to reduce the one or more amplified noise components in the output signal.

29. The method of claim 27, wherein;
the first input of the differential amplifier is coupled to a first capacitive sensor element and the second input of the differential amplifier is coupled to a second capacitive sensor element; and
wherein the correlated sampling process comprises:
coupling an output of the sampling capacitor to ground during the first clock phase and decoupling the output of the sampling capacitor from ground during the second clock phase;
coupling the first input of the differential amplifier to ground during the first portion of a first clock phase and decoupling the first input of the differential amplifier from ground during a second portion of the first clock phase;

coupling the second input of the differential amplifier to ground during the first portion of the first clock phase and decoupling the second input of the differential amplifier from ground during a second portion of the first clock phase; and coupling a reference voltage to the first and second capacitive sensor elements during the second clock phase and decoupling the reference voltage from the first and second capacitive sensor elements during the first clock phase.

30. The method of claim 29, further comprising storing the one or more amplified noise components from the differential amplifier in the sampling capacitor in at least the portion of the first clock phase, receiving the amplified differential sensor signal with the one or more amplified noise components from the differential amplifier in the sampling capacitor during the second clock phase, and blocking the one or more amplified noise components via the sampling capacitor to reduce the one or more amplified noise components in the output signal.

31. The method of claim 27, further comprising sampling and holding an output of the sampling capacitor in first and second output stages of a ping-pong demodulator on an alternating basis, wherein each of the output stages holds the output of the sampling capacitor for an amount of time sufficient to permit settling of at least some undesirable transients.

32. The method of claim 31, further comprising applying a feedback signal via a feedback path from an output of the ping-pong demodulator to an input to the ping-pong demodulator.

33. The method of claim 32, wherein the feedback path comprises:
at least one feedback capacitor that provides negative feedback to the output of the correlated sampling circuit.

34. The method of claim 33, further comprising:
controlling, using at least one switch, a voltage stored on the feedback capacitor.

35. The method of claim 33, alternating, using the at least one switch, between coupling the feedback capacitor to a reference voltage and an output of the ping-pong demodulator.

36. The method of claim 31, further comprising applying feedback signals via a first differential feedback path coupled between an output of the ping-pong demodulator and the first input of the differential amplifier, and a second differential feedback path coupled between an output of the ping-pong demodulator and the second input of the differential amplifier.

37. The method of claim 36, wherein the first input of the differential amplifier is coupled to a first capacitive sensor element of a pressure sensor, and wherein the second input of the differential amplifier is coupled to a second capacitive sensor element of a pressure sensor.

38. The method of claim 36, wherein the first feedback path comprises a first feedback capacitor, and wherein the second feedback path comprises a second feedback capacitor.

39. The method of claim 38, wherein the first feedback capacitor comprises a first end coupled to the first input of the differential amplifier, and wherein the second feedback capacitor comprises a second end coupled to the second input of the differential amplifier.

40. The method of claim 38, wherein the first feedback capacitor comprises a second end coupled to a first at least one switch, and wherein the second feedback capacitor comprises a second end coupled to a second at least one switch.

41. The method of claim 40, wherein the first at least one switch comprises a first switch and a second switch, and further comprising:
coupling, using the first switch, the first feedback capacitor to the output of the ping-pong demodulator; and
coupling, using the second switch, the first feedback capacitor to ground or a reference voltage.

42. The method of claim 40, wherein the second at least one switch comprises a first switch and a second switch, and further comprising:
coupling, using the first switch, the second feedback capacitor to the output of the ping-pong demodulator; and
coupling, using the second switch, the second feedback capacitor to ground or a reference voltage.

43. An implantable medical device, comprising:
means for amplifying a differential sensor signal to produce an output signal, wherein the means for amplifying comprises a first input, a second input, and an output;
means for storing the output signal on a sampling capacitor coupled to the output of the means for amplifying; and
means for applying a correlated sampling process that reduces one or more noise components in the output signal, wherein the means for applying the correlated sampling process comprises means for controlling the first and second inputs of the means for amplifying, responsive to timing signals provided by a clock distribution network that controls the means for applying, such that the means for amplifying amplifies the one or more noise components during at least a portion of a first clock phase and amplifies the differential sensor signal with the one or more noise components during a second clock phase, to reduce the one or more noise components in the output signal.

* * * * *

UNITED STATES PATENT AND TRADEMARK OFFICE
CERTIFICATE OF CORRECTION

PATENT NO. : 8,352,030 B2
APPLICATION NO. : 13/182276
DATED : January 8, 2013
INVENTOR(S) : Timothy J. Denison It is certified that error appears in the above-identified patent and that said Letters Patent is hereby corrected as shown below:

Col. 24, Line 28: "of the one of more" should read --of the one or more--

Col. 25, Line 49: "and the second input the differential" should read --and the second input of the differential"

Signed and Sealed this
Nineteenth Day of February, 2013

Teresa Stanek Rea
*Acting Director of the United States Patent and Trademark Office*